(12) United States Patent
Wipperfürth

(10) Patent No.: US 11,928,310 B2
(45) Date of Patent: Mar. 12, 2024

(54) VEHICLE SYSTEMS AND INTERFACES AND RELATED METHODS

(71) Applicant: Dial House, LLC, San Francisco, CA (US)

(72) Inventor: Alex Wipperfürth, San Francisco, CA (US)

(73) Assignee: Dial House, LLC, Healdsburg, CA (US)

( * ) Notice: Subject to any disclaimer, the term of this patent is extended or adjusted under 35 U.S.C. 154(b) by 601 days.

(21) Appl. No.: 16/390,931

(22) Filed: Apr. 22, 2019

(65) Prior Publication Data

US 2019/0324600 A1   Oct. 24, 2019

Related U.S. Application Data

(60) Provisional application No. 62/661,982, filed on Apr. 24, 2018.

(51) Int. Cl.

| | |
|---|---|
| *G06F 3/0482* | (2013.01) |
| *G01C 21/36* | (2006.01) |
| *G06F 3/0484* | (2022.01) |
| *H04L 51/02* | (2022.01) |
| *H04W 4/48* | (2018.01) |

(52) U.S. Cl.
CPC ....... *G06F 3/0482* (2013.01); *G01C 21/3667* (2013.01); *G01C 21/3682* (2013.01); *G06F 3/0484* (2013.01); *H04L 51/02* (2013.01); *H04W 4/48* (2018.02)

(58) Field of Classification Search
CPC ................. G06F 3/14; G06F 3/0482

USPC .............. 715/772; 455/456.6; 705/14.63, 13; 704/9, 21.001; 701/533, 117; 700/94; 707/737, 738; 340/576
See application file for complete search history.

(56) References Cited

U.S. PATENT DOCUMENTS

| | | | |
|---|---|---|---|
| 8,595,232 B1 * | 11/2013 | Azarm | G06Q 30/0621 707/738 |
| 10,838,686 B2 | 11/2020 | Kovacevic | |
| 10,897,650 B2 | 1/2021 | el Kaliouby et al. | |
| 10,911,829 B2 | 2/2021 | el Kaliouby et al. | |
| 2003/0182052 A1 * | 9/2003 | DeLorme | G06Q 10/047 340/990 |

(Continued)

*Primary Examiner* — Ruay Ho
(74) *Attorney, Agent, or Firm* — David R. Stevens; Stevens Law Group

(57) ABSTRACT

Vehicle methods disclosed herein include displaying, on one or more user interfaces of a vehicle display, a visual summary of a defined trip route. The visual summary may include a start indicator, and end indicator, a transition indicator (indicating a road switch), a road type indicator, a municipality indicator, time indicators (indicating times to transition points and municipalities), and fuel/charge indicators indicating refueling/recharging locations, among other details. Travelers may use the one or more user interfaces to determine desired stopping locations, desired route, goods and services provided at different stops along the way, and other items. Other vehicle methods disclosed herein include preparing a music playlist curated for a specific trip and taking into account various user-specific factors, and changing the playlist in response to changes in trip conditions. Other vehicle methods disclosed herein include interacting with a traveler using an interactive chatbot to, among other things, increase traveler wellbeing.

10 Claims, 22 Drawing Sheets

(56) References Cited

U.S. PATENT DOCUMENTS

| | | | |
|---|---|---|---|
| 2005/0075119 A1* | 4/2005 | Sheha | G01C 21/367 |
| | | | 455/456.6 |
| 2008/0291032 A1* | 11/2008 | Prokhorov | B64D 11/00155 |
| | | | 340/576 |
| 2009/0292528 A1* | 11/2009 | Kameyama | G10L 13/00 |
| | | | 704/E21.001 |
| 2011/0054646 A1* | 3/2011 | Hernandez | G06F 16/632 |
| | | | 701/117 |
| 2011/0118859 A1* | 5/2011 | Theimer | H04S 7/30 |
| | | | 700/94 |
| 2011/0276155 A1* | 11/2011 | Lindahl | G11B 27/34 |
| | | | 700/94 |
| 2014/0279021 A1* | 9/2014 | MacNeille | G06Q 30/0266 |
| | | | 705/14.63 |
| 2015/0228000 A1* | 8/2015 | Bijor | H04W 4/021 |
| | | | 705/13 |
| 2017/0006101 A1* | 1/2017 | Reimer | G06F 16/489 |
| 2018/0307504 A1* | 10/2018 | Aggarwal | G10L 15/1822 |
| 2019/0087707 A1* | 3/2019 | Cummins | G06F 16/3329 |
| 2019/0122661 A1* | 4/2019 | Hansen | G10L 15/22 |

* cited by examiner

| Traditional Genres | Streaming Service Genres | Trip-befitting Genres |
|---|---|---|
| Rock | Chill | Commute |
| Hip-Hop | Finger Style | Errand |
| Classical | Nerdcore | Road Trip |
| Reggae | Spytrack | Trip with Family |

| Tempo | Approachability | Engagement | Sentiment |
|---|---|---|---|
| Beats Per Minute | Chord Progression | Dynamics | Chord Type |
| | Time Signature | Pan Effect | Chord Progression |
| | Genre | Harmony Complexity | Lyric Content |
| | Motion of Melody | Vocabulary Range | |
| | Complexity of Texture | Word Count | |
| | Instrument Composition | | |

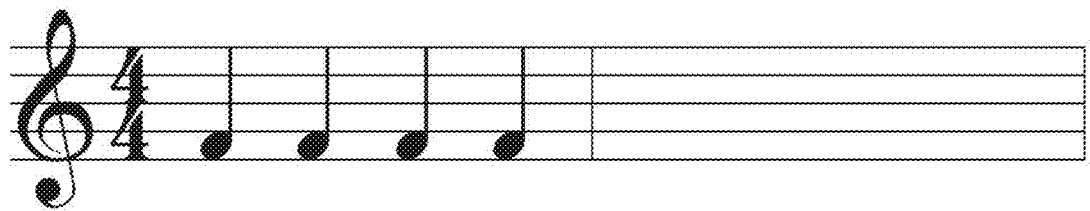
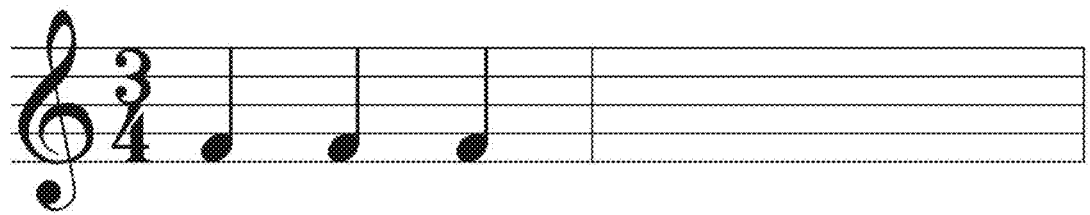
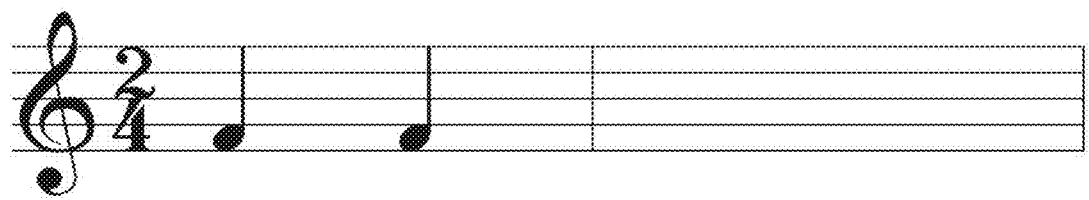
1600
FIG. 16

VEHICLE SYSTEMS AND INTERFACES AND RELATED METHODS

CROSS REFERENCE TO RELATED APPLICATIONS

This document claims the benefit of the filing date of U.S. Provisional Patent Application No. 62/661,982, entitled "Supplemental In-Vehicle (Passenger and Lifestyle Focused) System and Interface," naming as first inventor Alex Wipperfürth, which was filed on Apr. 24, 2018, the disclosure of which is incorporated entirely herein by reference.

BACKGROUND

1. Technical Field

Aspects of this document relate generally to systems and methods for vehicle navigation, systems and methods for vehicle music listening, and chatbot systems and methods for instruction and entertainment.

2. Background Art

Modern automotive vehicles include systems and interfaces that include biometric sensors, voice recognition, touch-screen interfaces, text-to-speech functionality, BLUETOOTH connectivity, Wi-Fi connectivity, GPS navigation, and smart phone integration. Often a driver may interface with one or more vehicle functionalities using an in-vehicle display located in the vehicle dashboard. Systems and methods for in-vehicle music listening exist in the art. Some chatbot systems and methods for instruction and entertainment exist in the art.

SUMMARY

Embodiments of vehicle methods may include: displaying, on one or more user interfaces shown on a display of a vehicle, a visual summary of a defined route for a trip (by non-limiting example, top of FIG. 7), the visual summary including: a start indicator representing a starting location of the defined route; a time remaining in the trip indicator (by non-limiting example, the circular icon and 1 H 57 MIN on FIG. 7); a progress indicator representing the vehicle's current location, weather conditions at the current location, and current status of the vehicle's stored energy (by non-limiting example, the column containing the weather icon, temperature, triangle, and fuel/charge icon); an end indicator representing an end location of the defined route; a weather indicator representing the weather at the starting location, ending location, and locations along the route (by non-limiting example, cloudy and 64 degrees on FIG. 7 indicate the temperature and conditions at the start location); a transition indicator, the transition indicator representing a transition location at which a driver of the vehicle will need to transition from a first road to a second road to remain on the defined route (by non-limiting example, circles on trip timeline of FIG. 7 associated with road switches, and highway/interstate numbers and icons at those road switches); a first estimated time indicator representing an estimated amount of time from a present time until a time at which the represented transition location will be reached (by non-limiting example, 3 MIN indicator on FIG. 7 proximate the 101 transition); a status of the vehicle's stored energy (by non-limiting example, a fuel/charge icon may show different states (more full, less full) depending on the location along the route on FIG. 7); a road type indicator representing a type of the second road (by non-limiting example, 101 and 128 outlines indicating an interstate and/or a highway in FIG. 7); a toll indicator representing that a fee will be paid along the route (by non-limiting example, the icon showing TOLL in FIG. 7); a municipality indicator representing a municipality located between the starting location and the end location (by non-limiting example, circles and text associated with Novato and Santa Rosa in FIG. 7); a second estimated time indicator representing an estimated amount of time from the present time until a time at which the represented municipality will be reached (by non-limiting example, 57 MIN indicator associated with Novato in FIG. 7); a fuel/charge indicator representing a location between the starting location and the end location at which the driver may refill or recharge the energy source of the vehicle (by non-limiting example, fuel/charge icon prior to the 128 transition in FIG. 7); a calendar event indicator representing the event that will occur at the destination (by non-limiting example, the calendar icon showing 11 AM in FIG. 7); an indicator of arrival time as it relates to the calendar event (by non-limiting example, 37 MIN EARLY indicator associated with the calendar icon and the estimated arrival time of 10:23 AM in FIG. 7); and an indicator of time of arrival (by non-limiting example, the circular clock icon and 10:23 AM in FIG. 7).

Embodiments of vehicle methods may include one or more or all of the following:

In response to user selection of a first selector displayed on the one or more user interfaces (by non-limiting example, OVERVIEW selector of FIG. 8), displaying the visual summary of the defined route for the trip (by non-limiting example, FIG. 7); in response to user selection of a second selector displayed on the one or more user interfaces (by non-limiting example, FILL UP selector of FIG. 8), displaying information about the best times and locations during the trip to fill up the vehicle's energy source; in response to user selection of a third selector displayed on the one or more user interfaces (by non-limiting example, BREAK selector of FIG. 8), displaying information about nearby locations along the route to use the restroom, stretch, or get a quick snack or drink; in response to user selection of a fourth selector displayed on the one or more user interfaces (by non-limiting example, EAT selector of FIG. 8), displaying information about nearby restaurants and eating locations along the route that suit the palette of the car occupants; in response to user selection of a fifth selector displayed on the one or more user interfaces (by non-limiting example, SIGHTSEE selector of FIG. 8), displaying information about nearby points of interest and sightseeing locations along the route; in response to user selection of a sixth selector displayed on the one or more user interfaces (by non-limiting example, PLACES selector of FIG. 8), displaying information about cities, businesses, services and other locations that are in the vicinity of the driver at any given time during the trip and the relative density of the aforementioned so that the traveler may make informed choices about when to take a detour (e.g., by taking a particular exit the traveler can get a coffee, refuel/recharge and take a restroom break); in response to user selection of a seventh selector displayed on the one or more user interfaces (by non-limiting example, DESTINATION selector of FIG. 8), displaying information about the destination (e.g., weather, businesses, services, and so on) to give the traveler a sense of the destination; in response to user selection of an eighth selector displayed on the one or more user interfaces (by non-limiting example, KIDS selector of FIG. 8), displaying information about nearby businesses, services, and locations (e.g., parks and playgrounds) along the route that may be of interest to children and families; in response to user selection of a ninth selector displayed on the one or more user interfaces (by non-limiting example, DOGS selector of FIG. 8), displaying information about nearby dog-friendly locations (e.g., parks, restaurants, hotels, and so on) along the route if a dog has been brought on the trip.

The methods may include displaying a PLACES interface (by non-limiting example, FIG. 9 interface) on the display, the PLACES interface including: a stop indicator representing a stop location where the driver may stop for services or goods (by non-limiting example, exit signs of FIG. 9); a travel time indicator indicating the time required to get to a particular stop (by non-limiting example, hours and minutes below the exit signs in FIG. 9); an arrival time indicator indicating the estimated time at arrival of each of the stops shown (by non-limiting example, the time in the future shown below the travel time indicators of FIG. 9); a provider indicator indicating a type of service or good provided at the stop location (by non-limiting example, dining, fast food, coffee, fuel/charge, and other circular icons of FIG. 9); and a quantity indicator indicating the number of providers of the indicated service or good at the stop location (by non-limiting example, the number below the darker circular icons of FIG. 9). In implementations the PLACES interface provides at-a-glance information for the traveler to make informed decisions about the places in his/her vicinity.

The methods may include displaying a providers interface (by non-limiting example, interface 1000 of FIG. 10) on the display in response to user selection of one of the provider indicators, the providers interface including a list of providers providing the indicated service or good at the stop location and, for each provider, a user generated rating (by non-limiting example, the star icons on interface 1000 of FIG. 10), an estimated price range (by non-limiting example, $ icons on interface 1000 of FIG. 10), a categorization (by non-limiting example, BAKERY on interface 1000 of FIG. 10), and an estimated time of travel to the provider. In some implementations, the display may show a fixed number of items in the list (by non-limiting example, five items are shown in interface 1000 of FIG. 10) that the user may scroll through (e.g., using a finger swipe on touch screens, a joystick or other navigational mechanism of the display, or another mechanism) in the event that there are more items available in the list.

The methods may include displaying a chosen provider interface (by non-limiting example, interface 1100 of FIG. 11) on the display, the chosen provider interface including one or more selectors restricting the list of providers displayed on the providers interface to only chosen providers.

The methods may include, in response to user selection of a music selector on one of the one or more interfaces (by non-limiting example, bottom center music selector of FIG. 7), initiating a music playlist.

The methods may include, in response to selection of a chatbot selector (by non-limiting example, bottom right chat selector of FIG. 7) on one of the one or more interfaces, initiating a chatbot interaction.

Embodiments of vehicle methods may include: receiving, at one or more computer processors (by non-limiting example, CPU of FIG. 3 and/or CPUs of servers [the CPUs not shown, but by non-limiting example within the servers] of FIG. 1) communicatively coupled with a user interface of a vehicle, one or more trip parameters (by non-limiting example, start location, stop location, and route, as input/ selected by a user, also parameters detected by the system automatically and/or determined by communication with third-party services such as vehicle occupants, whether the leaving place is home, work, or another place, whether children or animals are in the vehicle, weather; traffic conditions, and so forth) receiving, at the user interface, a user selection of a music library; in response to the user selection being communicated to the one or more computer processors (by non-limiting example, by communication from the user interface of the vehicle display to one or more of the above CPUs), preparing a music playlist using the one or more computer processors, wherein the music playlist is based at least in part on the one or more trip parameters; and in response to receiving a user command at the user interface (by non-limiting example, a verbal audio command or selection of the music icon at the bottom center of FIG. 7), playing the music playlist.

Embodiments of vehicle methods may include one or more or all of the following:

The methods may include querying one or more databases (by non-limiting example, database 108 of FIG. 1) using the one or more computer processors to determine a trip type associated through the one or more databases with the one or more trip parameters, wherein the music playlist is prepared using music tracks associated through the one or more databases with the trip type (by non-limiting example, an admin may have previously stored in the database a variety of trip types, such as those listed here, and each trip type may be associated through the database with trip parameters, such as "family trip" being associated through the database with trip parameters of a trip that leaves home in the morning, around school starting time, and includes a child in the car).

The trip type may include one of a commute, an errand, a road trip, a trip with family, and others.

The methods may include querying one or more databases using the one or more computer processors to determine levels of music tempo, music approachability, music engagement, and music sentiment associated through the one or more databases with the one or more trip parameters. By non-limiting example, the admin may have previously stored in the database trip parameters and associated them with levels of music tempo, approachability, engagement and sentiment—for example the database may include an association of low music engagement for the trip parameter of a trip leaving work during a time which indicates a business meeting with coworkers in the car, and an association of high music engagement for the trip parameter of leaving work in the evening to return home. As another example, the admin may have previously stored in the database associations of high music sentiment (positivity) and high music tempo with the trip parameter of slow traffic, or an association of low music tempo with the trip parameter of a driver detected speeding or driving faster than usual, and so forth.

The music tempo may be defined as beats per minute, the music approachability may be defined by one or more (or all) of chord progression, time signature, genre, motion of melody, complexity of texture, and instrument composition, the music engagement may be defined by one or more (or all) of dynamics, pan effect, harmony complexity, vocabulary range, and word count, and music sentiment may be defined by one or more (or all) of chord type, chord progression, and lyric content.

The methods may include receiving, at the one or more computer processors, one or more modified trip parameters indicative of a traffic change; preparing, in response to the traffic change, using the one or more computer processors, a modified playlist; and playing the modified playlist. By non-limiting example, the receipt at the processors of the modified trip parameter may be a direct input by a user or any sensed change by the system, such as a change in vehicle speed, a change in weather determined by the system based on communication with a third party weather service, a change in the user's sensed mental state or mood (such as gripping of steering wheel, tone of voice, speed of vehicle), and so forth. The modified playlist may be so modified that it includes no tracks that were in the original playlist, or it may still include some tracks from the original playlist. The modified playlist may be played automatically so that, from the traveler's perspective, there is no pause as the modified playlists begins.

The music playlist may be based at least in part on a key of each song so that harmonically compatible songs are placed next to one another in the music playlist.

The music playlist may include some partial tracks, and some transitions between playlist tracks may include a fading out of one track while fading in a similar-sounding portion of another track, overlapping tracks, or blending tracks to have continuous music playback.

Embodiments of vehicle methods may include: receiving, at one or more computer processors communicatively coupled with one or more user interfaces of a vehicle, one or more trip parameters; determining, by the one or more computer processors, using data from one or more sensors communicatively coupled with the one or more computer processors, a current mental state of a traveler in the vehicle; initiating, using the one or more computer processors, interaction with the traveler using an interactive chatbot, wherein an interaction content of the interactive chatbot is determined by the one or more computer processors based at least in part on the current mental state of the traveler.

Embodiments of vehicle methods may include one or more or all of the following:

The methods may include receiving from the traveler, through the one or more user interfaces, a selected level of control, and wherein the interaction content of the interactive chatbot is determined by the one or more computer processors based at least in part on the selected level of control.

The methods may include entertaining children in the vehicle with the interactive chatbot by iteratively attempting music, interactive games, and interactive conversation.

The interaction content may include the interactive chatbot querying the traveler about whether the traveler's phone, computer, and/or other item is in the vehicle in response to a determination by the one or more computer processors that a wireless signal from the traveler's phone (e.g., BLUETOOTH, other near-field communication [NFC], or other signal) is not detected.

The methods may include initiating a conversation, using the interactive chatbot, in response to a lull in a conversation among vehicle occupants of a predetermined amount of time.

General details of the above-described embodiments, and other embodiments, are given below in the DESCRIPTION, the DRAWINGS, and the CLAIMS.

BRIEF DESCRIPTION OF THE DRAWINGS

Embodiments will be discussed hereafter using reference to the included drawings, briefly described below, wherein like designations refer to like elements:

FIG. 13 is a table representatively illustrating elements of the example music compilation method of FIG. 21 which is implemented using the system of FIG. 1;

FIG. 14 is a table representatively illustrating other elements of the example music compilation method of FIG. 21;

FIG. 16 is a diagram representatively illustrating other elements of the example music compilation method of FIG. 21;

DESCRIPTION

Implementations/embodiments disclosed herein (including those not expressly discussed in detail) are not limited to the particular components or procedures described herein. Additional or alternative components, assembly procedures, and/or methods of use consistent with the intended vehicle systems and interfaces and related methods may be utilized in any implementation. This may include any materials, components, sub-components, methods, sub-methods, steps, and so forth.

Figure 1:
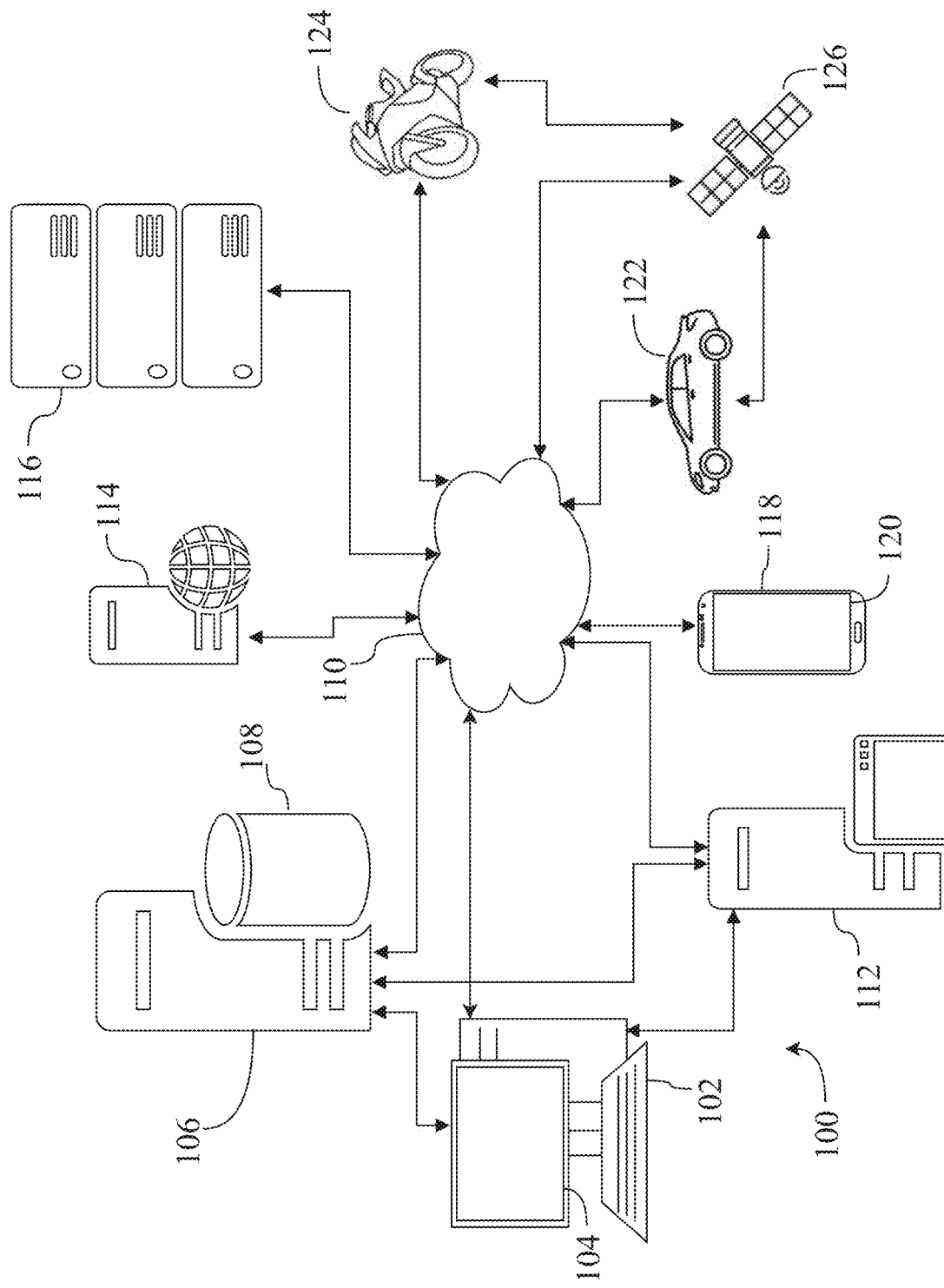
FIG. 1 is a diagram view of an implementation of a vehicle system.

Referring now to FIG. 1, a representative implementation of a vehicle system (system) 100 is shown. Other vehicle systems may include additional elements and/or may exclude some elements of system 100, but some representative example elements of system 100 are shown. Computing device (device) 102 includes a display 104 through which an administrator may access various elements of the system using a variety of user interfaces. Device 102 is seen communicatively coupled with a database server (DB server) 106 which in turn is communicatively coupled with a database (DB) 108. The administrator may configure one or more databases and one or more database servers for storing various data used in conjunction with the methods disclosed herein.

The administrator device 102 may be directly communicatively coupled with the database server or could be coupled thereto through a telecommunications network 110 such as, by non-limiting example, the Internet. The admin and/or travelers (end users) could access elements of the system through one or more software applications on a computer, smart phone (such as device 118 having display 120), tablet, and so forth, such as through one or more application servers 112. The admin and/or end users could also access elements of the system through one or more websites, such as through one or more web servers 114. One or more off-site or remote servers 116 could be used for any of the server and/or storage elements of the system.

One or more vehicles are communicatively coupled with other elements of the system, such as vehicles 122 and 124. Vehicle 122 is illustrated as a car and vehicle 124 as a motorcycle but representatively illustrate that any vehicle (car, truck, SUV, van, motorcycle, etc.) could be used with the system so long as the vehicle has a visual and/or audio interface and/or has communicative abilities through the telecommunications network through which a traveler may access elements of the system. A satellite 126 is shown communicatively coupled with the vehicles, although the satellite may rightly be understood to be comprised in the telecommunications network 110, only to emphasize that the vehicles may communicate with the system even when in a place without access to Wi-Fi and/or cell towers (and when in proximity of Wi-Fi and/or cell towers may also communicate through Wi-Fi and cellular networks).

The system 100 is illustrated in an intentionally simplified manner and only as a representative example. One or more of the servers, databases, etc. could be combined onto a single computing device for a very simplified version of system 100, and on the other hand the system may be scaled up by including any number of each type of server and other element so that the system may easily serve thousands, millions, and even billions of concurrent users/travelers/vehicles.

Figure 2:
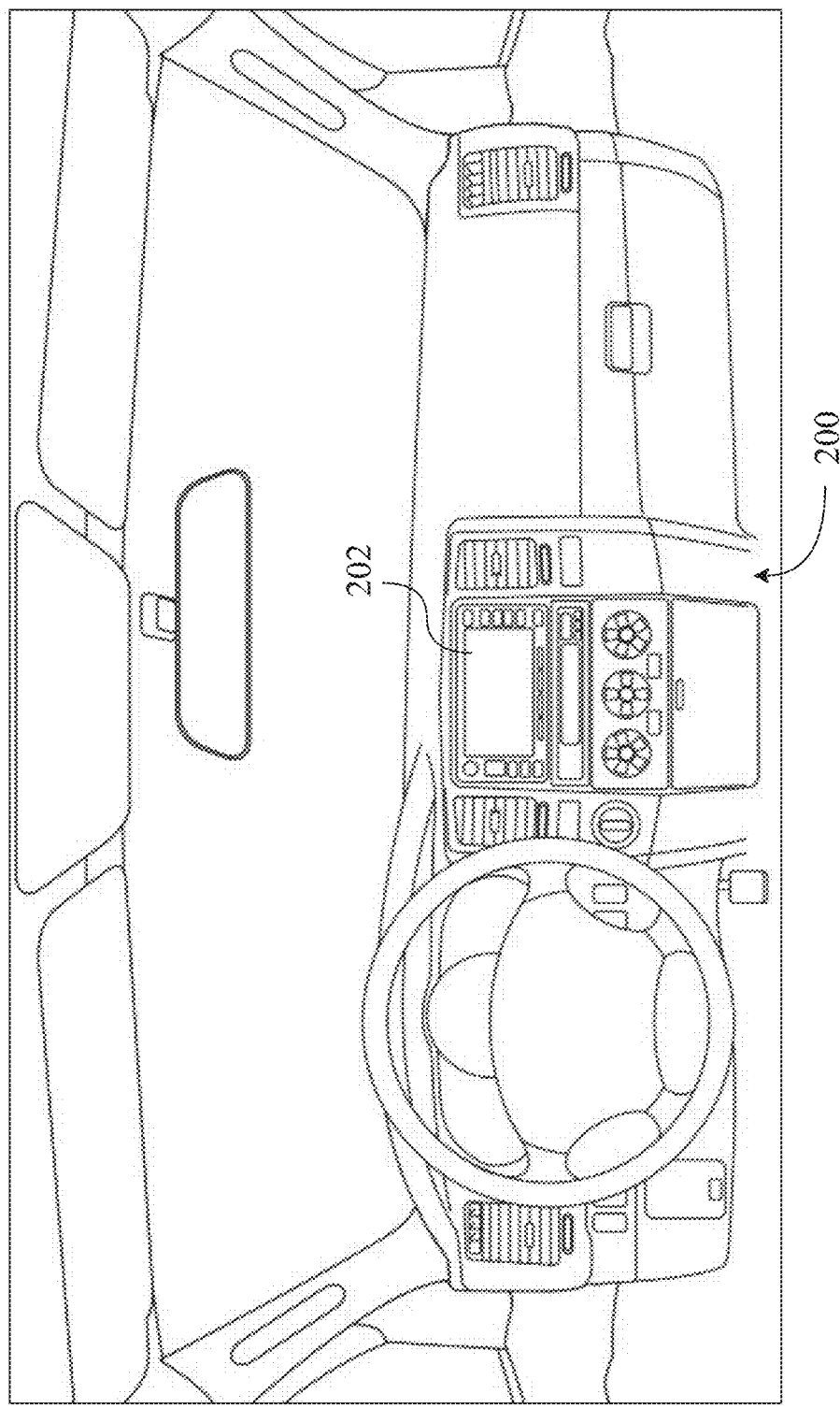
FIG. 2 is a front view of a vehicle dashboard having a display on which user interfaces of the system of FIG. 1 may be displayed.

Referring now to FIG. 2, a representative example of a vehicle dashboard (dashboard) 200 is shown, on which a display 202 is located. On a display such as this various user interfaces, enabled by the system 100, may be shown to a traveler, and may be used for visual communications to and from the traveler. In-vehicle audio elements, such as a vehicle microphone to receive user audio input and speakers to communicate and/or provide sound to the user, may also provide user communication with elements of system 100.

Figure 3:
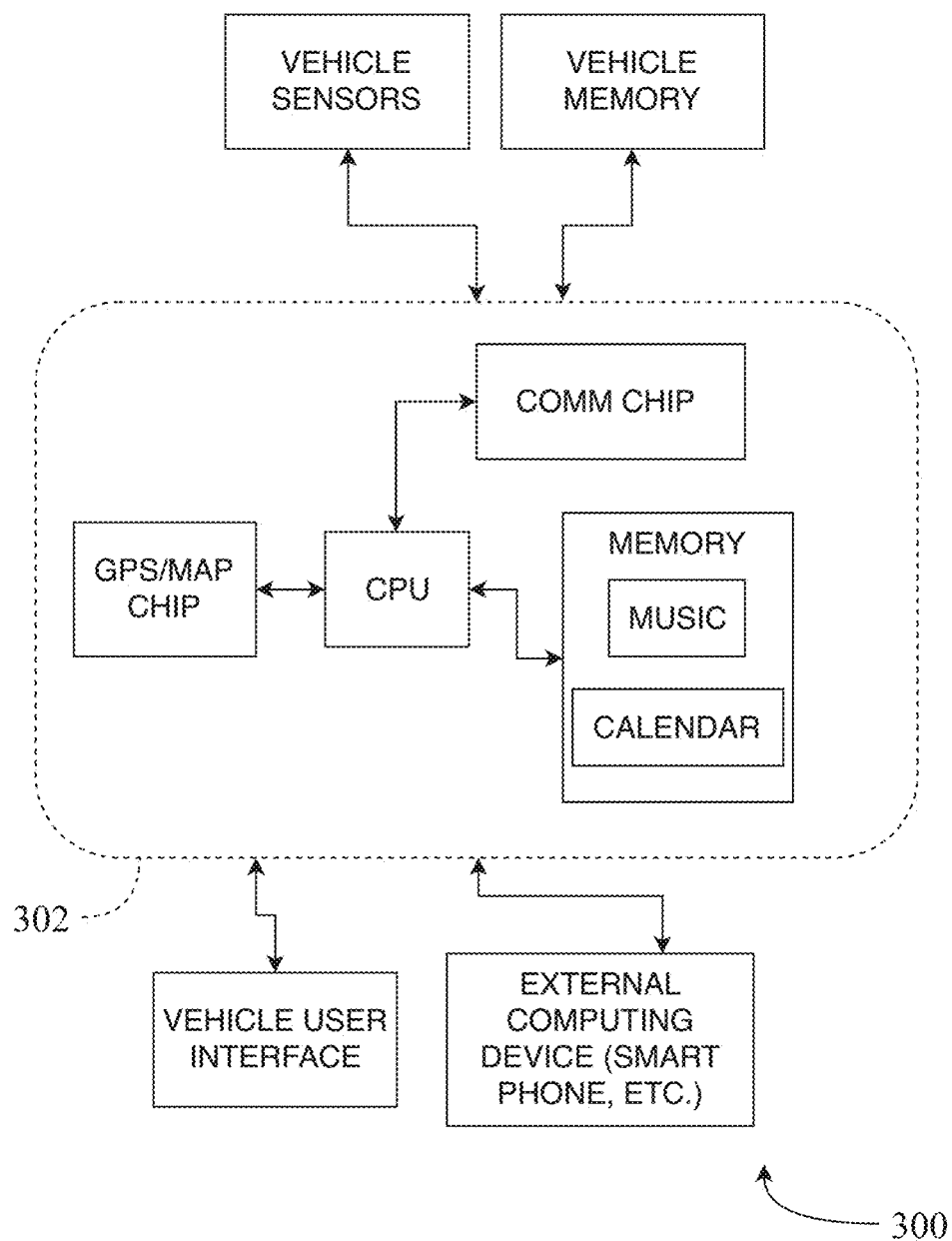
FIG. 3 is a block diagram of a subset of elements of the system of FIG. 1 which may exist in or on a vehicle.

Referring now to FIG. 3, the system 100 may also include elements located within or coupled directly with a vehicle. For example, block diagram 300 shows a representative example of a Trip Brain 302 which includes a central processing unit (CPU), a GPS or map chip, a communications (COMM) chip, and on-board memory. These elements could all be coupled on a single printed circuit board (PCB) and located within the dashboard (or elsewhere on/in the vehicle) communicatively coupled with the display 202 and with the vehicle's audio elements (speakers and microphone, not shown) and biometric sensors which together comprise the vehicle user interface. The Trip Brain may receive input from the vehicle user interface through voice or audio commands, physical button/selector/knob inputs, touchscreen inputs, and so forth. The Trip Brain may send data to the vehicle user interface for visual display and/or audio output to the traveler. A traveler's external computing device (smart phone, laptop, tablet, etc.) may also send data to, and receive data from, the Trip Brain in like manner over wireless signals such as through Wi-Fi, cellular, BLUETOOTH, or the like using the communications chip.

The communications chip (which in implementations may actually be multiple chips to communicate through Wi-Fi, BLUETOOTH, cellular, near field communications, and a variety of other communication types) may be used to access data stored outside of system 100, for example the user's GOOGLE calendar, the user's PANDORA music profile, and so forth. The communications chip may also be used to access data stored within the system database(s) (which may include data from an external calendar, an external music service, and a variety of other elements/applications that have been stored in the system database(s)). Local memory of the Trip Brain, however, may also store some of this information permanently and/or temporarily.

Figure 4:
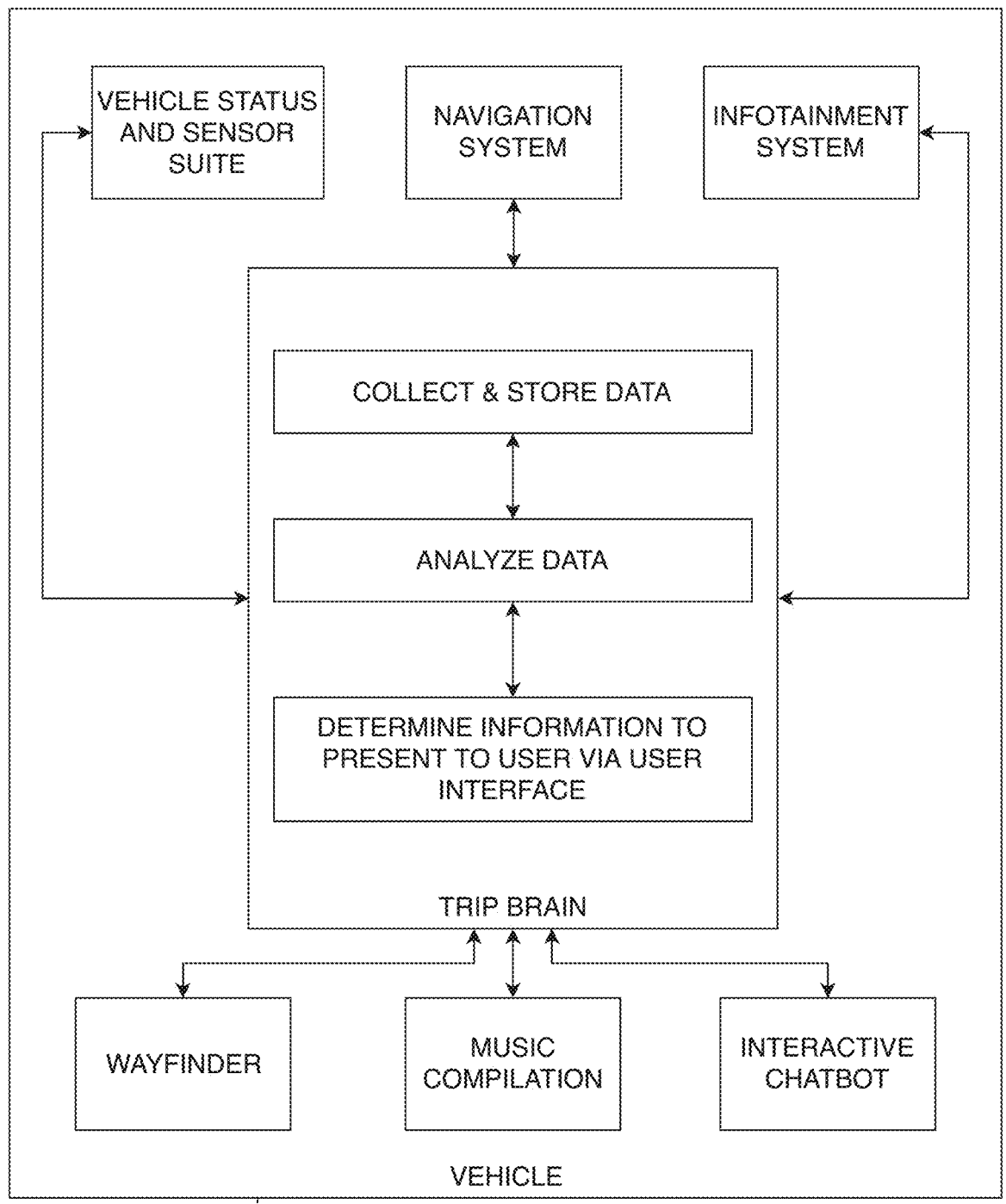
FIG. 4 is a block diagram representatively illustrating relationships between elements, and methods associated with elements, of the system of FIG. 1.

The Trip Brain is also seen to be able to access information from the vehicle sensors and the vehicle memory. In implementations the Trip Brain only receives data/information from these and does not send information to them (other than queries) or store information therein, but as data queries may in implementations be made to them (and to a vehicle navigation system) the arrow connectors between these elements and the Trip Brain in FIGS. 3-4 are illustrated as two-way connectors. Similarly, as the Trip Brain may receive input from users through one or more Wayfinder interfaces, one or more Music Compilation interfaces, and or through user interaction with the Interactive Chatbot, as will be discussed more below, the arrows connecting those elements with the Trip Brain in FIG. 4 are also shown as two-way connectors.

The Trip Brain may include other connections or communicative couplings between elements, and may include additional elements/components or fewer components/elements. Diagram 300 only shows one representative example of a Trip Brain and its connections/communicative couplings with other elements. In some implementations some processing of information could be done remote from the vehicle, for example using an application server or other server of system 100, so that the Trip Brain is mostly used only to receive and deliver communications to/from the traveler. In other implementations the Trip Brain may include greater processing power and/or memory/storage for quicker and local processing of information and the role of external servers and the like of system 100 may be reduced.

Referring now to FIG. 4, block diagram 400 representatively illustrates in more detail the functionality of the Trip Brain. This functionality includes, in implementations, data collection, analysis, and management. The Trip Brain allows for every kind of trip to be its own unique type of experience determined by the specific qualities of the trip. By non-limiting example, in implementations there are six major contextual qualities that may define a trip, and the Trip Brain may, using user input (directly acquired from user input and/or passively acquired by system listening, including through biometric, speech, facial recognition and other sensors) and/or acquired by the system accessing information externally (such as through Internet information sources, GPS data, and so forth), structure the experience accordingly. In such implementations the six qualities are:

(1) Trip progression: How will the drive evolve? How long will the trip be? Will the type of road change (i.e., from city to highway)? Will there be traffic jams? Toll roads, etc.

(2) Intent, the purpose of the trip: Is it a commute, an errand, a trip to a meeting, a road trip?

(3) The social dynamic within the cabin: Is the driver alone, traveling with family, with friends, with weak social connections? The driver's experience will be dramatically different depending on the context.

(4) The driver's state of mind: Is the driver reflective? Frustrated? Does s/he need to reboot their brain?

(5) The trip conditions: What is the weather like outside? What are the speeds of travel?

(6) Regularity of the trip: Is the trip part of a larger pattern? Is it a recurring, even regular trip? Is there a time and/or day of week (e.g., only on Saturdays) pattern to it? Are there certain behaviors associated with this particular route, like stopping for a coffee or gas? Are routine choices being made?

FIG. 4 shows the navigation system existing outside of the Trip Brain, and indeed this is an option different than what was presented in FIG. 3. The vehicle may already have its own GPS chip and/or navigation system, and the Trip Brain may simply communicate with the existing navigation system as shown in FIG. 4.

FIG. 4 also shows that the Trip Brain collects and stores data. In implementations the information provided by the car's sensors and other vehicle information is accumulated over time by the Trip Brain in order to assess the aforementioned qualities of context. This data input is precise and manageable as it is derived only from concrete sources available to the car system. For example, in the example of FIG. 4 a navigation application is already able to present the last destination entered, store destinations, and so on. The Trip Brain, however, also combines, tracks and analyzes the information so that it can learn and adjust based on previous behavior and so that the same information can be used in other services and applications, not only in the app from which it was sourced. In other words, the accumulated data collected is shared among various applications and services instead of being isolated. The storage half of "Collect & Store" may include storage in local memory and/or storage remotely, by accessing storage elements communicatively coupled with the Trip Brain through the telecommunications network.

FIG. 4 also shows that the Trip Brain does data analysis. Each trip may contain data from various sources including the vehicle's sensors and other vehicle information, the navigation application, the infotainment system, connected external devices (laptop, smart phone, etc.), and so on. The Trip Brain synthesizes the information in order to make inferences about the qualities of context that define a trip.

In implementations the trip progression can be derived from the navigation system.

In implementations intent can be derived by analyzing the cumulative historical information collected from the navigation system (e.g., the number of times a particular destination was used, the times of day of travel, and the vehicle occupants during those trips) as well as the traveler's calendar entries and other accessible information.

In implementations the social dynamic in the car can be deduced by the navigation (e.g., type of destination), the vehicle's voice and face recognition sensors, biometric sensors, the infotainment selection or lack thereof, the types and quantity of near field communication (NFC) objects recognized (e.g., office keycards), and so on.

In implementations the occupants' state of mind can be determined via the vehicle's biometric, voice and face recognition sensors, the usage of the climate control system (e.g., heat), infotainment selection or lack thereof, and so on. For example, a driver of the vehicle may be in a bad mood (as determined by gripping the steering wheel harder than usual and their tone of voice, use of language, or use of climate control system) and may be accelerating too quickly or driving at a high speed. The system may be configured to provide appropriate feedback to the driver responsive to such events.

In implementations the road conditions can be sourced through the car's information and monitoring system (e.g., speedometer, external sensors, weather app, the navigation system and the Wayfinder service, which will be explained in detail below).

In implementations regularity of the trip can be determined through cumulative historical navigation data, calendar patterns, and external devices that may be recognized by the vehicle (e.g., personal computer).

In implementations the Trip Brain analyzes each data point relating to a particular trip and provides direction for the Wayfinder, Music Compilation, and Interactive Chatbot features. These features are implemented through the one or more vehicle user interfaces (presentation layer) in a way that is cohesive, intuitive and easy to understand and use. In implementations (as in FIG. 4) the Trip Brain may interact with an existing infotainment system present in a vehicle, such as by non-limiting example by obtaining information and/or entertainment material through the infotainment system to present to the travelers through the AI Sidekick or otherwise. As an example the Trip Brain may obtain from the infotainment system a list of news stories, pop-culture events, and so forth and the Interactive Chatbot may present these to the travelers and ask if they are interested in knowing more about any given one, and if so may proceed to give more information related thereto.

In implementations the Trip Brain and the system 100 architecture are based on system design thinking rather than just user design thinking. As a result, it offers a comprehensive service that is not only designed for individual actions, but considers the entire experience as a coherent service that considers each action as part of the whole. Consider, for example, the audio aspect of infotainment. One possible alternative to streaming music sequentially is to render it in a manner similar to a DJ mix: having a beginning, a middle, and an end, and sometimes playing only parts of songs instead of complete tracks. The characteristics of the mix (e.g., sentiment) may be based on the attributes of the trip (e.g., intent). To accomplish this the Trip Brain may acquire and store information from the vehicle navigation system to let the music app know, via the Trip Brain, the context associated with the trip such as duration, intent, social dynamic, road conditions and so on. If the Trip Brain has information from the navigation system and calendar indicating the driver of the vehicle is heading to a business meeting at a new location, the vehicle interface system can, using the Interactive Chatbot, prompt the driver fifteen minutes before arrival and provide the driver with the meeting participants' bios to orient the driver for the visit.

As indicated by FIGS. 3-4, in implementations there is a symbiotic connectivity between the different vehicle systems through the Trip Brain. For example, the Trip Brain may receive input from the vehicle navigation system, infotainment system (music/telematics), car sensors, a calendar or planner associated with a user of the vehicle that may be a part of the infotainment system, outside sources (like a smart phone), and other vehicle information such as type of vehicle, weight, and so forth, all managed and interpreted by the Trip Brain and turned into actionable directives for the Wayfinder, Music Compilation, and Interactive Chatbot services, and delivered to the user through one or more user interfaces.

The system and methods provide an intelligent in-vehicle experience that supplements the existing vehicle features. The intelligent in-vehicle experience is based on data collection, analysis, and management and integrates the different components of the driver-vehicle interface. The Wayfinder, Music Compilation, and Interactive Chatbot features, discussed further below, are presented to the driver in a cohesive, intuitive format that is easy to understand and use. This intelligent vehicle experience may in implementations (and herein may) be referred to as "TRIP." The Trip Brain reads inputs from the car's navigation application and other input sources such as weather, calendar, etc. that are configured to provide location coordinates and other trip-related information to the vehicle interface. This information is used by the Trip Brain to direct Wayfinding, Music Compilation, and Interactive Chatbot (wellbeing and productivity) functions.

Figure 5:
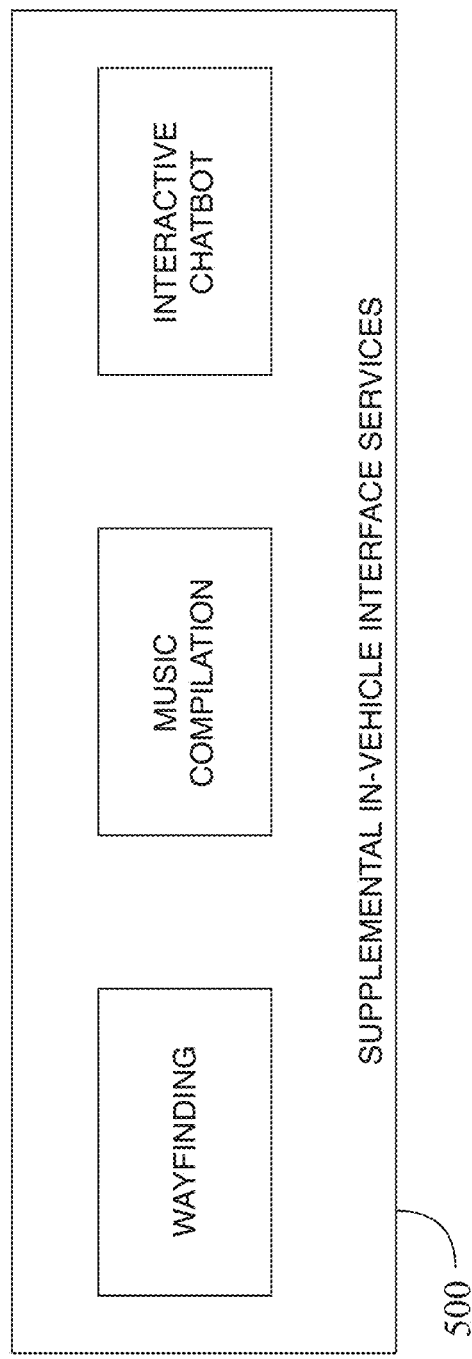
FIG. 5 is a block diagram representatively illustrating example processes implemented by the system of FIG. 1.

Referring now to FIG. 5, block diagram (diagram) 500 representatively illustrates that, in some implementations, the functionality of the system 100 and/or Trip Brain may be broadly organized into three categories: Wayfinding (which is more than mere navigational mapping, and which may be referred to as "Wayfinder"); DJ-like Music Compilation (which may be referred to as "Soundtrack"); and an artificial intelligence (AI) Interactive Chatbot (which may be referred to as "Sanctuary"). These services are distinct from what exists in current vehicle systems, and are accordingly designated "supplemental" in FIG. 5. Each of these functions may be used discretely in implementations, and in implementations they may all also be interconnected.

In implementations the Wayfinding, Music Compilation, and Interactive Chatbot experience allow the car cabin to function as a unique "in-between" or "task-negative" space (as opposed to an on-task space such as the workplace or the home) that lets travelers' minds wander, helps them emotionally reset, and serves as a sanctuary and a place of refuge. The Wayfinding, Music Compilation, and Interactive Chatbot features will be discussed on more detail below.

Wayfinding Service

The Wayfinding service (Wayfinder) may be implemented using one or more user interfaces that are displayed on display 202, but is more than a navigational map. While conventional navigational maps serve the driver operating a car with route selection, turn-by-turn directions and distances (e.g., number of miles to the next turn), the Wayfinder serves the passenger's trip-related orientation and activities for life outside the car. It exists to help people along a drive, enhance their understanding and enrich their experience of the route and destination. Additionally, the Wayfinding service provides flexibility in the visual presentation and organization of the map, allowing for infographic (or more infographic) as opposed to cartographic (or primarily cartographic) presentation. For example, in implementations distracting and static street grid elements are removed. In implementations the Wayfinding service may focus more on showing the user's traveling times or time ranges, as opposed to distances, involved in a given route. In these ways, the Wayfinding service conveys trip information in a way that is easier to understand (e.g., time instead of distance) and uses a design element herein termed "Responsive Filtering," in that information not pertinent to a passenger's question at hand (i.e., miles, street grid layout, etc.) are removed to avoid overload.

In implementations, before beginning a trip, the Wayfinding service may present an animated three-dimensional suggested route for the driver, or a route selected by the driver, to orient the driver and give a sense of the trip ahead. This feature is called "Trip Preview." In implementations the system may, using the AI Sidekick/Interactive Chatbot, narrate an overview of the trip to the driver synchronous with the animation, providing information that includes expected duration of trip, route, weather conditions, road conditions, traffic along the way, and so forth. The system may also provide information about weather conditions at the destination.

Figure 6:
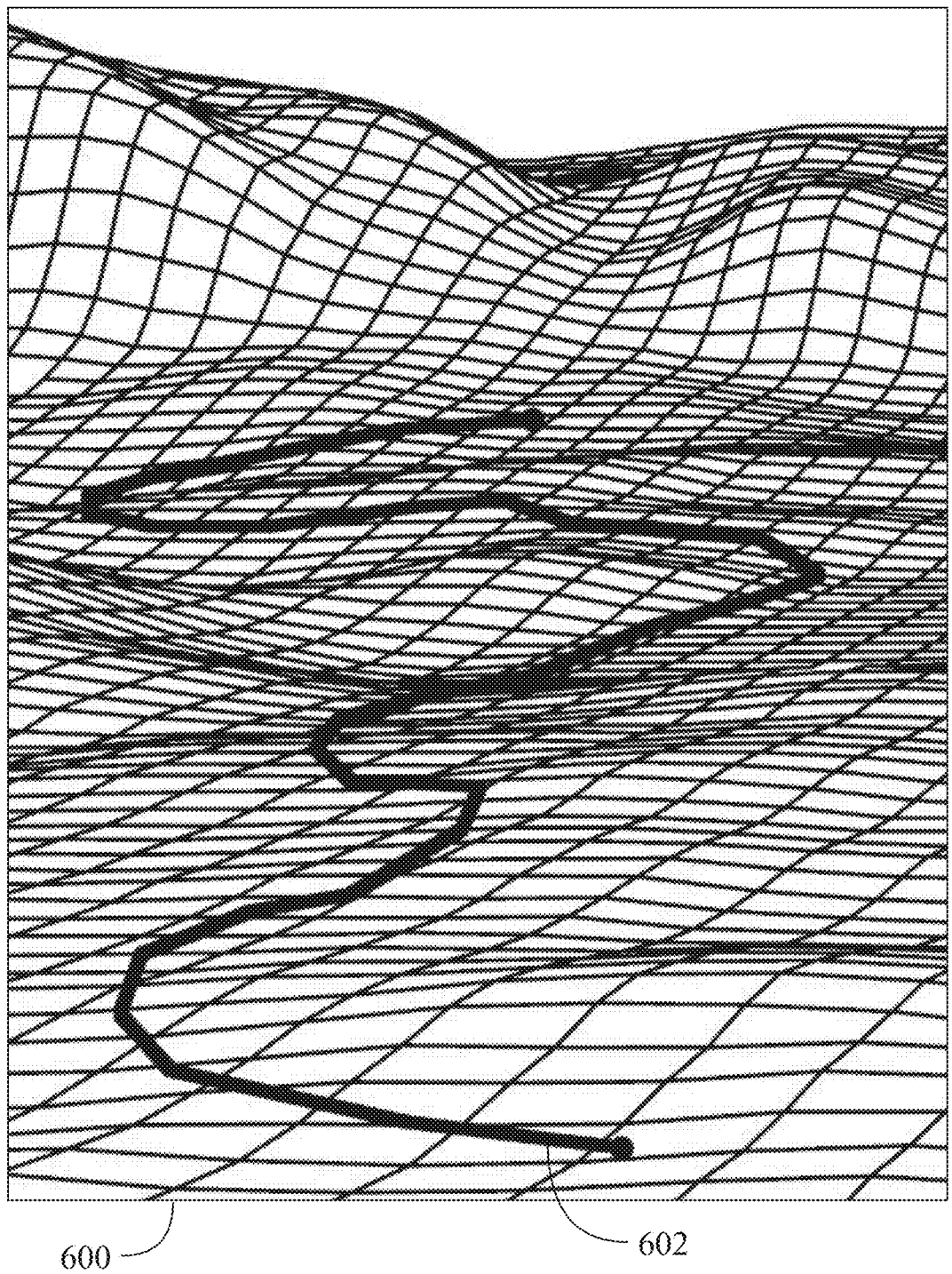
FIG. 6 is a diagram of an example user interface of the system of FIG. 1.

FIG. 6 shows a representative example of an interface 600 that may be displayed to the driver using the display 202, and illustrates an example of a single frame from an animated three-dimensional rendition of the trip that may be displayed to the driver. FIG. 6 shows three-dimensional landscape with grid-like texture to show elevation, but this is only one representative example. The landscape may be shown as an animation of actual natural-looking or photographic-like (or video-like) representations of features such as hills, rivers, lakes, cities, towns, canyons, bridges, and so forth. In implementations a user may be able to zoom in and out with commands (in implementations touch-screen commands), rotate the view, toggle between optional paths/ routes, exit the view, and so forth. FIG. 6 shows a path 602, for example, that starts with a beginning near the bottom of the page and ends at an ending place nearer the top of the page. In implementations the user could toggle between this path/route and other paths/routes as desired before selecting which route to take. In implementations the driver may make edits to any given path or route to make modifications to it before beginning the trip. Such changes to individual routes, and toggling between routes, may in implementations also be done during the trip. Accordingly, while interface 600 may show a preview of a trip, it may also be displayed whenever desired during a trip to see trip progress from a three-dimensional landscape perspective. The path 602 or route is shown as a solid line, but it may be illustrated in any manner, such as a dotted line, a line of any color, and so forth.

In implementations the visual shown on interface 600 is more of a flyover visual, such as a visual similar to those used by the STRAVA route builder or by the GOOGLE MAPS interface, which in implementations may be a dynamic aerial presentation to the traveler which shows the route starting from beginning and moving the visual to the end of the trip in an animated fashion. In implementations the system may interface with STRAVA or GOOGLE MAPS APIs, or other APIs, to provide the dynamic visuals to the traveler.

Figure 7:
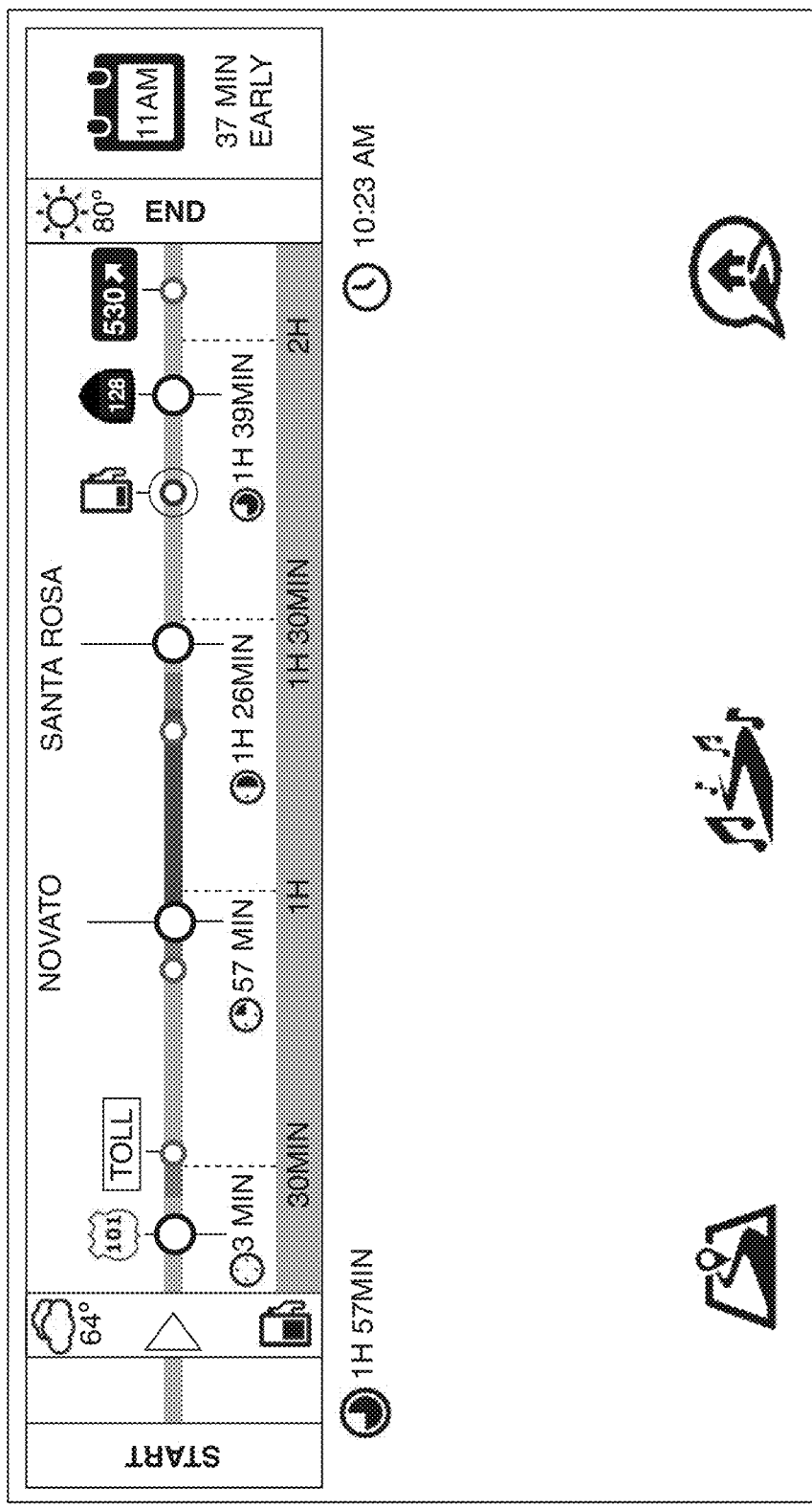
FIG. 7 is a diagram of another example user interface of the system of FIG. 1.

FIG. 7 shows a representative example of another interface of the system 100, which in implementations may be called the Tracker or Trip Tracker. This interface may be shown on display 202 and may in implementations show a summary of the trip at hand. The summary is visually displayed in a way that a short glance gives the user an updated sense of the trip, relative to his/her current location along the route. The Trip Tracker does not replace the navigational applications provided by car systems or external devices but rather complements them. In implementations the Trip Tracker is a permanent and dynamic resident of the car dashboard, for example being by default displayed on display 202 during a trip. It is the visual infographic representing each drive, conveying key information and progress within one quick glance such as a timeline, waypoints, and other features/details of a trip.

The Trip Tracker interface in implementations includes selectors that are selectable to expand (to provide further detail) and/or to navigate to other windows/interfaces. As seen in FIG. 7, the bottom of the infographic display presents three icons. The leftmost icon is an icon that initiates the Wayfinder service. The middle icon is associated with the Music Compilation service (discussed subsequently) called Soundtrack, and the rightmost icon represents the Interactive Chatbot, which may be called Sanctuary, discussed more below.

The top part of FIG. 7 shows an infographic associated with a trip. Here, a driver wishes to drive from San Francisco, CA, to Yorkville, CA, for a meeting. The infographic displays the temperature at the starting location. The infographic indicates that the driver has already started the trip and will travel on the 101 freeway three minutes from the current time. The band at the lower part of the infographic shows a timeline, demarking 30-minute intervals in this instance (time intervals in implementations would depend on the duration of a particular trip). Important aspects of the trip such as a use of a toll road and a need to fill gas or recharge the vehicle are also displayed on the infographic. Important waypoints, such as Novato and Santa Rosa in this example which have clusters of businesses and services, may be displayed on the infographic, with the approximate time at which the driver is expected to reach those waypoints. In this example, the driver is expected to reach Novato in 57 minutes, and Santa Rosa in 1 hour and 26 minutes. After approximately 1 hour and 39 minutes, the route suggests that the driver stop for gas before merging onto the 128 freeway and exiting towards the destination. Based on existing conditions and the current location, the driver is expected to reach the destination in 1 hour and 57 minutes from the point shown in the Trip Tracker, at approximately 10:23 AM, or 37 minutes early for an 11 am appointment. The infographic may also display the anticipated temperature at the destination, which may change during the trip based on updated information. In implementations, while the traveler is en route the column shown in FIG. 7 containing the weather, temperature, triangle and fuel/charge icon will move along the trip tracker interface and the contents of the column (e.g., weather) may change due to current conditions. In implementations, if the traveler arrives at his/her destination with time to spare, the AI chatbot may proactively suggest ways to spend the time. In this example, the AI chatbot may suggest reviewing names, backgrounds, etc., of the meeting attendees or the AI chatbot may suggest a timely detour to use the restroom and otherwise physically prepare for the calendar event.

The information displayed on the infographic is generally dynamically updated in real-time based on current conditions, to include weather and traffic. This may be done, for example, by the Trip Brain or other elements of the system periodically querying databases or Internet information related to weather, road conditions, and so forth. As a non-limiting example, the Trip Brain and/or other elements of the system could access road conditions, weather conditions, gas prices, electric vehicle charging stations and related prices (as appropriate), toll amounts, and so forth by communicating with third-party programs and tools through application programming interfaces (APIs). If done by the Trip Brain the one or more elements of the Trip Brain could directly access information through one or more third-party APIs, or alternatively the Trip Brain could communicate with one or more servers of the system 100 that itself obtains/updates such information using third-party APIs, or the system 100 could regularly update a database with such information using third party APIs so that the Trip Brain can update the information on the infographic by regularly querying the database for road conditions, weather, and so forth relevant to the specific trip.

During the trip, the AI assistant may offer audio prompts to the driver on an ongoing basis regarding upcoming events, such as a toll road, a need to change freeways, a need to fill gas, suggest a rest stop (e.g., after a prolonged period in the car) and so on. Using an infographic system in this way avoids information overload for the driver, allowing the driver to instantly comprehend the information and quickly and easily make informed decisions.

Other elements of the infographic are useful to provide quick information to the user. For example: the weather at each the beginning and ending locations may also be represented by an icon (clouds, rain, snow, sunny); the various highways, toll roads, freeways, entrances, exits, etc. may be represented by icons which are indicative of the type of road or event; weather conditions could be shown for intermediate towns/cities; gas and/or charge icons may be represented as more filled, half filled, less filled (similar to those shown in FIG. 7) to indicate an expected gas tank or charge level, and so forth. The line shown at the middle of the infographic that runs horizontally from the start location to the end location is also seen to have various shades to represent traffic conditions, for example darker for slower traffic conditions or traffic jams, and lighter for less traffic and slowing. In implementations these could be represented with different colors, such as gray for no slowing, orange for some slowing, and red for more severe slowing, as representative examples. Useful colors may be used for other things, like red for more important events (such as a red gas icon for a more critical need to fill up, a flashing icon for an important event, greed road or highway number signs to match with the actual road or highway signs, and so forth.

In implementations one or more icons of interface 700 may be selectable to bring up more information. There may be an icon on interface 700 which when selected brings up interface 600, previously described. Any of the icons of interface 700 may be selectable to bring up more relevant information about the item represented by the icon, such as weather information brought up in response to touching a weather icon, gas price or location information brought up in response to touching a gas icon, city or town information brought up in response to touching the wording of an intermediate town or city, and so forth.

Figure 8:
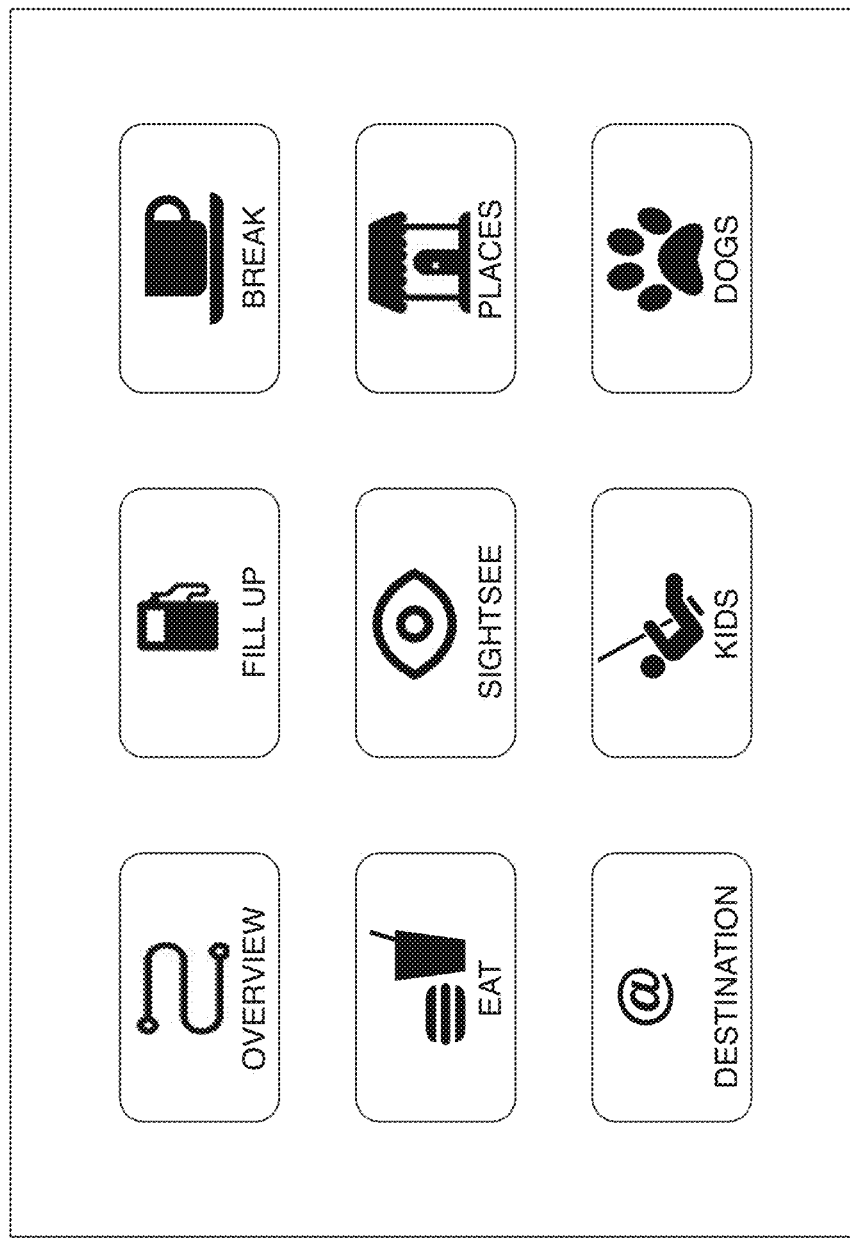
FIG. 8 is a diagram of another example user interface of the system of FIG. 1.

In implementations if a user selects the Wayfinding icon in the bottom left corner of interface 700 the interface 800 of FIG. 8 is displayed on display 202. The Wayfinder service may have several features which will be discussed—these features may be customized and presented to the car occupants based on, for example, car occupants' preferences and the nature of the trip. Interface 800 includes various selectors, having associated icons, which a user may select such as through touch (in the case of a touchscreen display 202) or using a joystick or other navigational mechanism of the display (similar to any other selector described herein). Other Wayfinding options may be available in other implementations, but the options/selectors represented in FIG. 8 are discussed below as representative examples.

Overview: Selecting this selector switches to an infographic view as shown in FIG. 7, providing a time-based overview of the trip with important waypoints. In other words, selecting the overview option provides the travelers with information about what the trip looks like, what they need to be aware of, where they are now, when they will get to the destination, how much time is left, and so on.

Fill Up: Selecting this selector brings up an interface (not shown in the drawings) which indicates appropriate times and places to refuel or recharge the vehicle based on the vehicle status (e.g., level of charge) and location along the route.

Break: Selecting this selector brings up an interface (not shown in the drawings) indicating appropriate places and times to take a break based on, for example, how long the trip has continued uninterrupted. A break could include stopping to stretch, have a coffee break, or use a restroom.

Eat: Selecting this selector brings up an interface (not shown in the drawings) which provides information on restaurants on the way to the destination. In implementations the types of restaurants shown may be those that suit the palettes of the car occupants as determined by prior information gathered from the car occupants.

Sightsee: Selecting this selector brings up an interface (not shown in the drawings) which provides information on any special sights or points of interest to see along the trip.

Places: Selecting this selector brings up an interface providing information regarding places could include cities, businesses and so on that are in the vicinity of the travelers at any particular given time. Other information could include a densest cluster of places and services to accomplish more than one task during a stop (e.g., getting a coffee, refueling/recharging and taking a restroom break). A representative example of a Places interfaces is interface 900 shown in FIG. 9 and will be discussed hereafter.

Destination: Selecting this selector brings up an interface (not shown in the drawings) which provides information about the destination (e.g., weather, where to eat, and so on) to give the travelers a good sense of their destination.

Kids: Selecting this selector brings up an interface (not shown in the drawings) which provides information on nearby parks, playgrounds, kid-friendly restaurants and so forth along the trip.

Dogs: Selecting this selector brings up an interface (not shown in the drawings) which provides information about dog-friendly places (e.g., dog parks, places to walk, etc.) if a dog has been brought on the trip.

In implementations the system may show other icons/selectors on interface 800, representing other information, and may include fewer or more selections. In implementations the system may intelligently decide which icons to show based on some details of the trip—for example including the Kids selector if the vehicle microphone picks up a child's voice and the trip is longer than a half hour, including the Dogs icon if the vehicle microphone picks up noises indicative of a dog in the vehicle, excluding the Sightsee selector if the system determines that the traveler does not have time to sightsee and still make it to an appointment in time, and so forth. Any of these intelligent decisions could be made locally by the Trip Brain, or could be made by other elements of the system (such as one or more of the servers communicatively coupled with the Trip Brain through the telecommunications network) and communicated to the Trip Brain. In implementations, the user may decide which icons to show based on preferences—for example excluding the KIDS selector if the user does not have children—that later may be changed by the user or temporarily intelligently changed by the system based on some details of a trip—for example, temporarily including the KIDS selector if the vehicle microphone picks up a child's voice.

Any interface, when brought up by a selector, may simply be a display which has no interactive elements, or which may have only an interactive element to close the interface, though any of the disclosed interfaces may also have interactive elements, such as additional selectors to be selected by a user to accomplish other tasks or bring up other information, or otherwise for navigation to other interfaces/windows. In any instance in which an interface is brought up by selecting a selector the interface may replace the preexisting interface on the display, or it may be shown as an inset interface with the background interface still shown (or shown in a grayed-out fashion, as illustrated in FIG. 10 as a representative example), and in such instances the user may be able to return to the underlying screen/interface by touching the screen anywhere outside of the topmost interface/screen.

Figure 9:
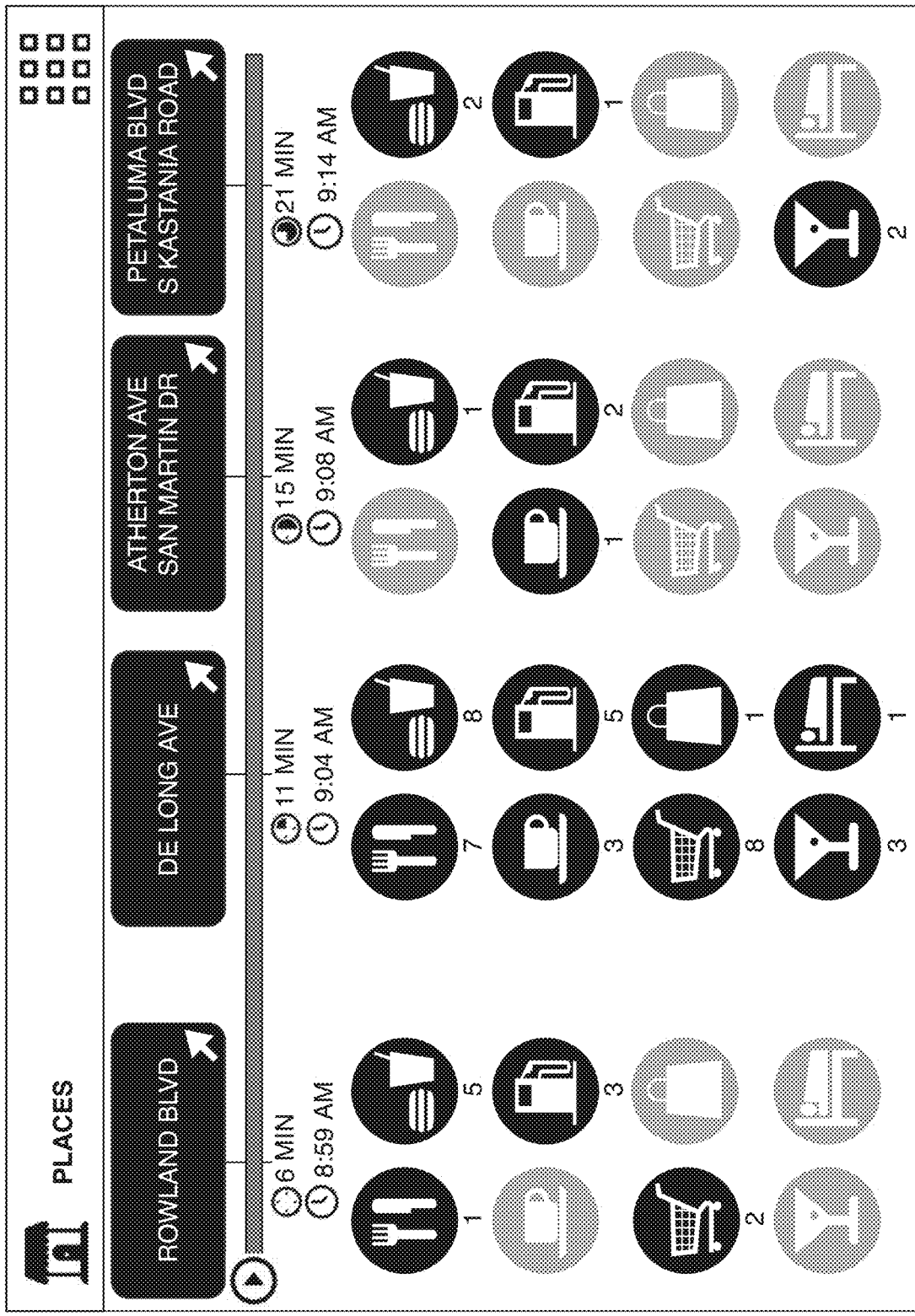
FIG. 9 is a diagram of another example user interface of the system of FIG. 1.

As indicated above, FIG. 9 shows a representative example of an interface 900 which is displayed when a user selects the Places selector from interface 800. In general, the longer a trip, the more stops the driver is likely to make, such as for food, gas, snacks, bathroom breaks, and so on. The Places interface shown in FIG. 9 depicts, in the representative example, the next four exits along the driver's route. Rowland Boulevard is 6 minutes away, with an expected arrival time of 8:59 AM. De Long Avenue is 11 minutes away, with an expected arrival time of 9:04 AM, and so on. In implementations exits that have already been passed are not displayed as a driver may not want to backtrack, though in implementations a user could change this setting by using a settings interface which may be brought up using a selector (not shown) on a home screen such as interface 700 or 800. Places that are more than 10 minutes off-route also may not be displayed, though again this may in implementations also be changed by editing a user's preferences in a settings interface. Under each exit sign are icons that indicate the types and numbers of services are available; services that are not available are grayed out in the representative example. For example, travelers can find sit-down restaurants (fork and knife icon), fast food restaurants, fuel/charge stations, and grocery stores if they exit at Rowland Blvd, but not coffee, shopping, bars, or overnight accommodations (e.g., hotel). De Long Avenue, on the other hand, offers more options, including coffee, shopping, overnight accommodations and bars. Showing a list of the different services available at each possible waypoint allows a driver to choose which stop will accomplish multiple tasks in the least amount of time possible. Suppose the driver selects the dining (sit-down restaurant) icon under the De Long Avenue exit. This brings up a list of restaurants that are open or will be open by the anticipated arrival time where the driver can eat, as shown in FIG. 10 with interface 1000.

In implementations fewer or more stops/exits could be shown on interface 900. The top right corner of interface 900 shows a grid icon which may be selected to bring the user back to the top menu interface 800. It is also seen in FIG. 9 that interface 900 shows the number of each type of item, for instance at the Atherton Ave./San Martin Dr. exit the user would find one fast food restaurant, one coffee shop, and two fuel/charge stations. In implementations the icons of FIG. 9 may be selected to bring up more information about a selected icon—such as a list of fast food restaurants or a list of gas stations with prices, and so forth.

Figure 10:
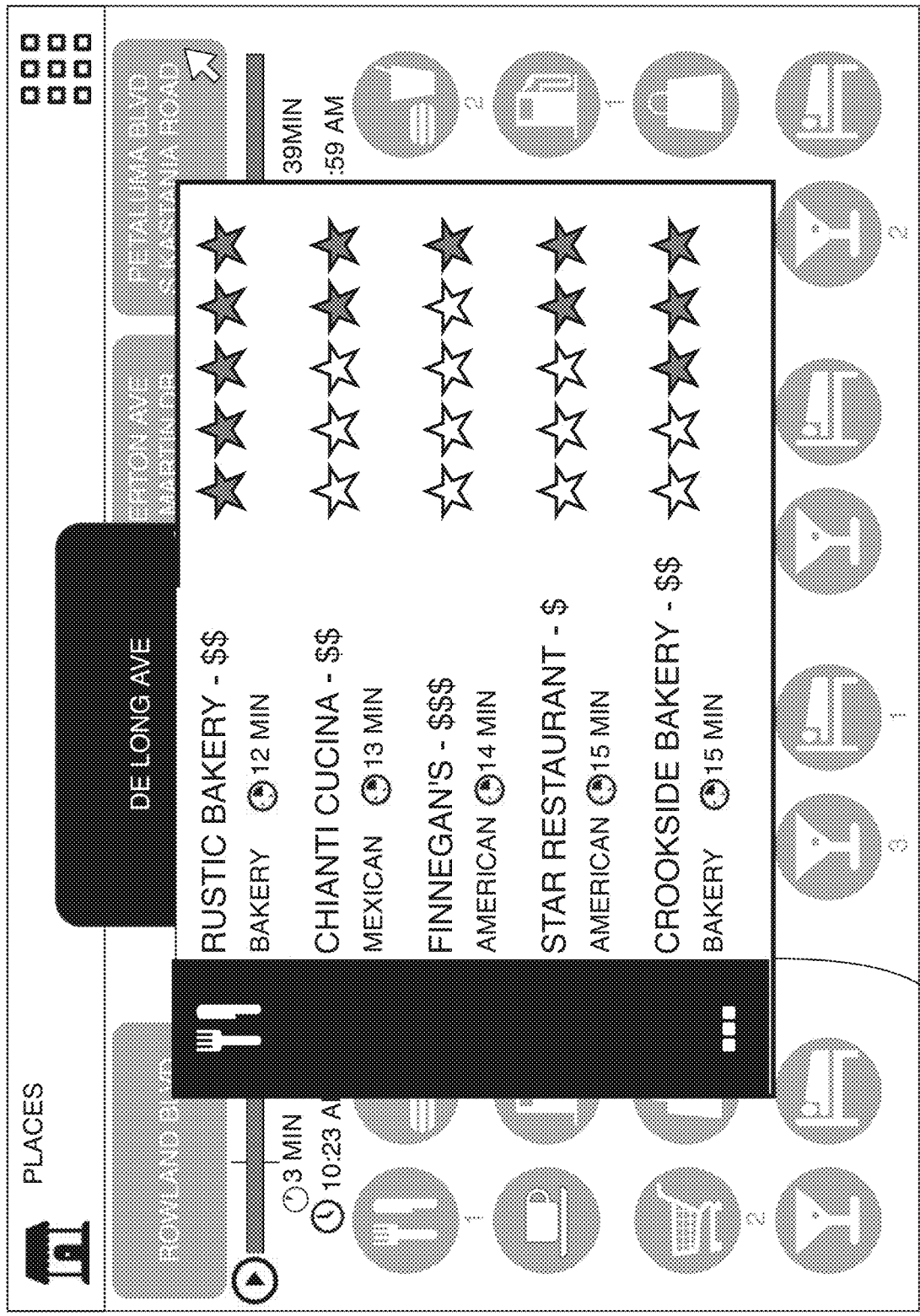
FIG. 10 is a diagram of another example user interface of the system of FIG. 1.

In FIG. 10 the user has selected the sit-down restaurant icon under the De Long Ave. exit (such as by touching or otherwise selecting the icon) and interface 1000 has, in response, appeared on top of interface 900 (which is then grayed out). The dining options displayed in interface 1000 may include information such as the name, average cost of a meal, type of cuisine, number of minutes away from current location, average rating, and so forth. The driver may then select a particular restaurant and complete other tasks (e.g., get a newspaper and fill gas). By selecting a particular restaurant, such as with a touch selection or other selection, from interface 1000 the system may update the user's trip to include a stop at the restaurant and to navigate the user there. A selector (three dots) at the bottom left of interface 1000) could be selected to adjust food settings, such as desired cuisine of a user, desired rating level, desired price level (on this and/or other trips) to be shown on interface 1000. In implementations a user could tap or otherwise select the rating of a restaurant to bring up reviews of the restaurant in the display, which in implementations may be read to the user.

Although FIG. 10 gives the specific example of the user selecting sit-down restaurants to see in more detail, in implementations a window such as that of FIG. 10 could be shown in response to the user selecting any other icon, for example an interface showing similar information related to coffee shops off of Atherton Ave./San Martin Dr. when a user selects the coffee icon under that stop, or an interface showing similar information related to grocery stores off of Rowland Blvd. when the user selects the shopping cart icon under that stop, and so forth.

Figure 11:
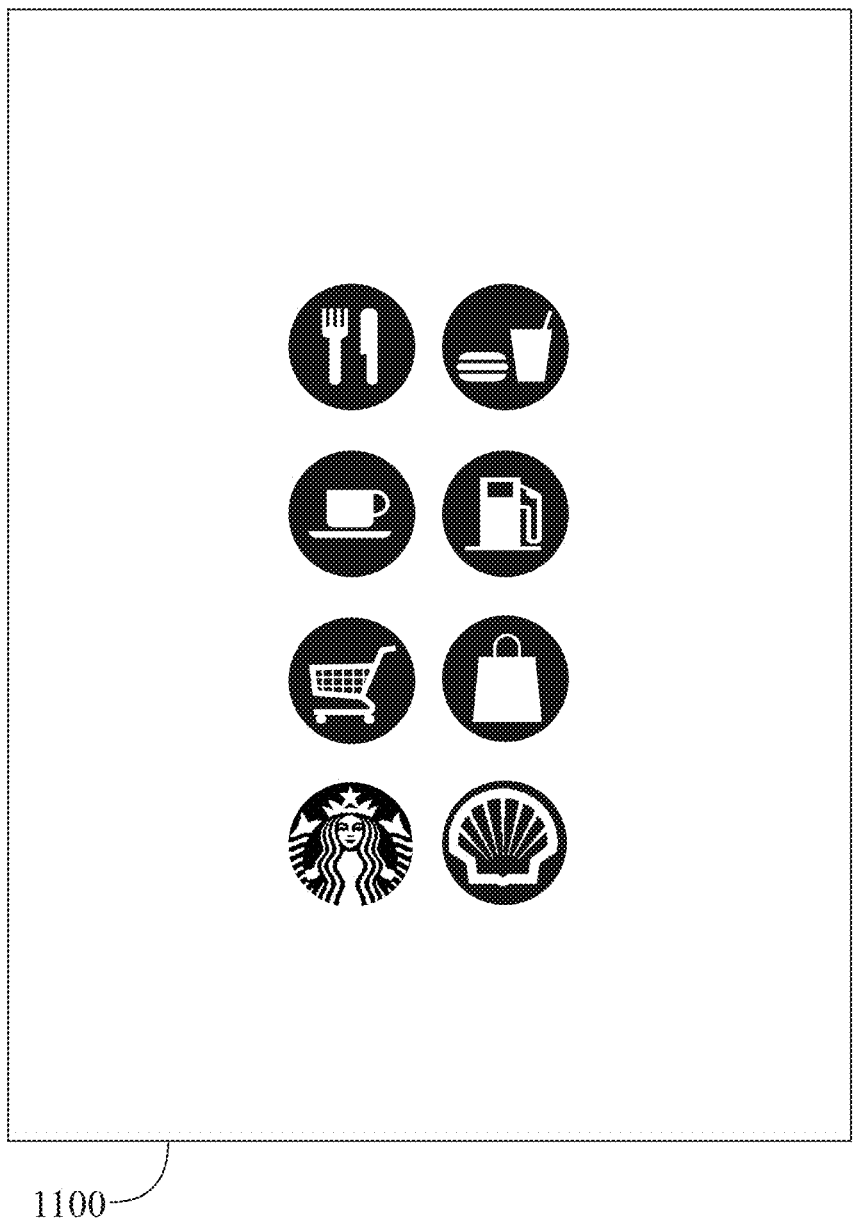
FIG. 11 is a diagram of another example user interface of the system of FIG. 1.

In implementations the icons of FIG. 9 are customizable and editable. For example, a driver can remove services they don't want or would never use and add services they do want or use frequently. As shown in FIG. 11, the system may include an interface 1100 (such as accessible from a settings interface or interface 900 using a not-shown selector) wherein a user may select desired services and icons. In FIG. 11 the user has added a STARBUCKS icon and a SHELL icon to display his often-used coffee shop and gas station brand, respectively. In such an implementation the user could, if desired, then remove the coffee shop and gas station icons, so that the system only displays to the user which stops have STARBUCKS coffee shops and SHELL gas stations. Further customization may be done—for example a user could leave the gas icon unchanged but edit the settings so that only SHELL and ARCO gas stations are shown, edit the shopping icon to a MACY'S icon and adjust the settings so that only MACY'S and IKEA stores are shown with regards to shopping locations, remove the fast food option entirely, and so forth. In implementations the system includes a store of icons of specific services/places for user customization. On interface 1100 a user could see the settings of a particular service/item by tapping the respective icon, edit the settings or icon image by long-pressing or double-tapping the respective icon, and/or other verbal commands/options may be available using other actions.

Another example of an interface that could be implemented would be a FILL UP interface (such as when the user selects the FILL UP icon from interface 800 of FIG. 8). The FILL UP interface could, in implementations, include a ranked listing of tables without any geography. For example, the vehicle computer and/or the Trip Brain will know how much longer the vehicle can drive before needing to fill up. With that in mind, the FILL UP interface may show a first table which lists the best fill-up stations in terms of detour time (e.g., they could be ranked 1-4 with 1 being the station that takes the least amount of time away from the trip). A second table could rank fill-up stations according to price. A third table could rank fill-up stations according to a combination of detour time and price, and so forth. In the case when FILL UP refers to a charge station, a table could show the best charge stations in terms of proximity to other walkable activities (e.g., nearby coffee shops and other businesses) and density of such activities. Other tables or information could be shown on the FILL UP interface, and a user may select the preferred station from any of the tables, and that location will be added to the directions.

Figure 12:
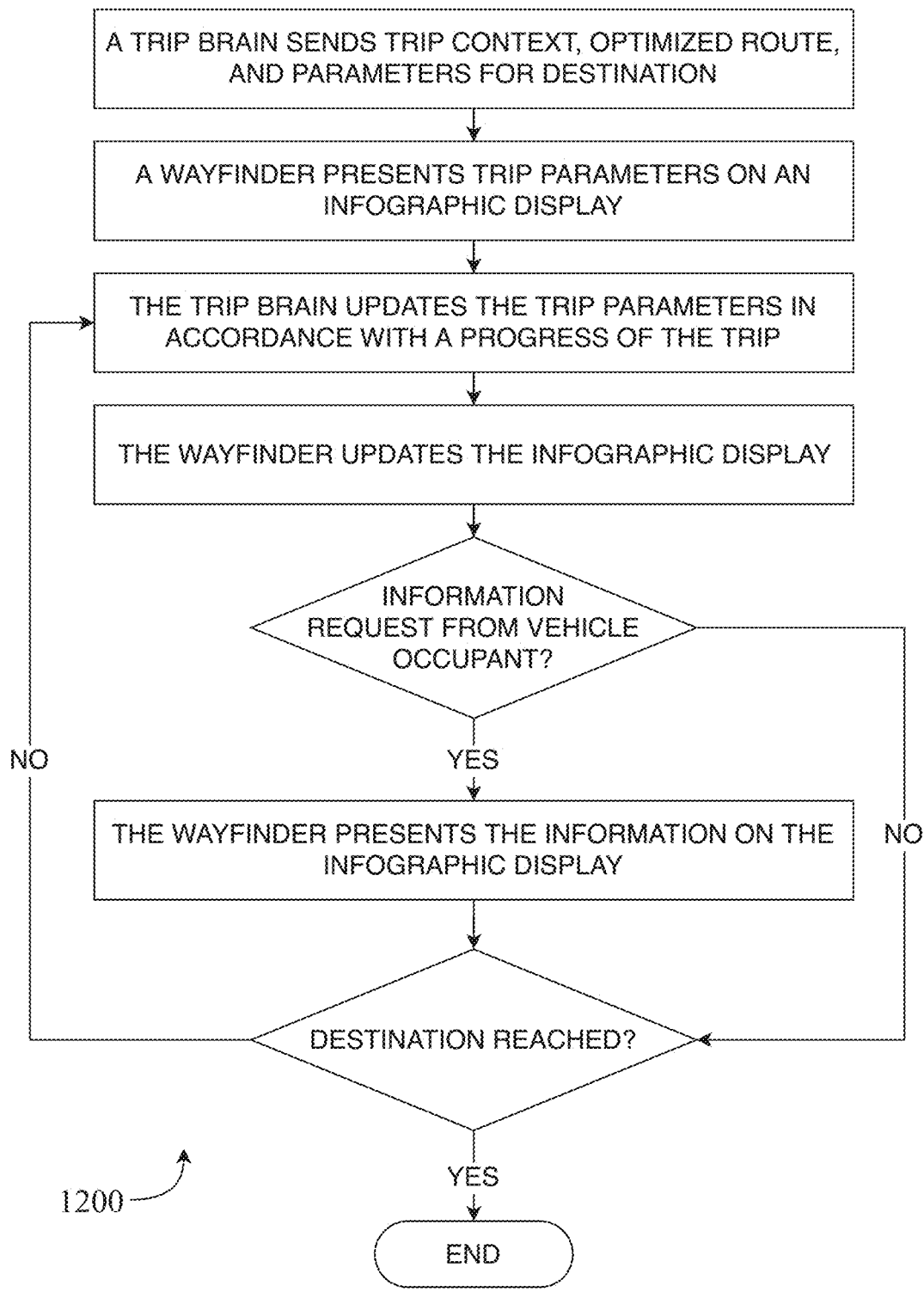
FIG. 12 is a flowchart representatively illustrating an example of a wayfinding method implemented using the system of FIG. 1.

FIG. 12 shows a flow diagram (flowchart) 1200 depicting the general operation of Wayfinder as discussed above. Referring to the flow diagram, in implementations the Trip Brain determines the six qualities of trip context and sends an optimized route for the trip and trip parameters such as traffic and waypoints as discussed above. Information about the trip may be presented to a traveler in the form of an infographic as shown in FIGS. 6 and/or 7. As the trip progresses and more information is collected and analyzed by the Trip Brain, Wayfinder presents updated trip parameters in accordance with a progress of the trip. For example, a traffic jam might change the estimated time of arrival or may necessitate a rerouting of the trip. The traveler is notified about the updated trip parameters via the infographic display (and, in some implementations or according to user settings, audibly by the AI Sidekick).

At some point in the trip, Wayfinder may receive a request for information associated with the trip from the traveler. For example, the driver may select the FILL UP option to search for a gas or charging station (this interaction, like many others, may be done using one or more of the user interfaces and/or audibly by driver interaction with the AI Sidekick). Wayfinder then presents the requested information to the driver in accordance with the current trip parameters. Wayfinder periodically checks to see if the destination is reached. This is done on an ongoing basis until the destination is reached. If the destination is not reached, Wayfinder continues to present updated trip parameters in accordance with a progress of the trip. When the destination is reached, the process ends. This is only one representative example of a flowchart of the Wayfinder service, and other implementations may include fewer or more steps, or steps in different order.

Music Compilation Service (Soundtrack)

Referring back to FIG. 7, in implementations a user may select the Music Compilation icon at the bottom center of the screen to initiate the Music Compilation service. Selecting this selector may start playing music directly, but in implementations it may also bring up one or more user interfaces which show details of the Music Compilation—such as currently playing song, next song, selectors to pause/skip/fast-forward/rewind, and so forth. In implementations when a user selects the Music Compilation icon from interface 700 the details of the Music Compilation may simply appear or be shown within interface 700 itself, such as below the trip information at the top of interface 700, though in other implementations there may be a separate Music Compilation interface that is brought up when the user selects the Music Compilation icon on interface 700 and then the user may revert back to interface 700 by selecting a selector on the Music Compilation interface (or the system may be set to automatically revert to interface 700 after no user interaction has been received by a predetermined amount of time, such as a few minutes).

In implementations the system implements the Music Compilation service in a way that it is noticeably different from conventional music streaming services, so that the Music Compilation is a DJ-like compilation. This may return music listening in the vehicle to something more like an art form. In implementations the Music Compilation service creates a soundtrack for the trip (or in other words selects songs and portions of songs for a soundtrack) based on the details of the drive. The Music Complication service (which may be called Soundtrack) may be implemented using the Trip Brain, though some portions of the implementation may be done using one or more servers and/or databases of the system and/or in conjunction with third party APIs (such as accessing music available through the user's license/profile from one or more third-party music libraries) and such. In implementations the Music Compilation service is implemented by the Trip Brain adaptively mixing music tracks and partial music tracks in a way that adjusts to the nature and details of the trip, instead of playing music tracks in a linear, sequential yet random fashion as with conventional music streaming services. The Trip Brain in implementations implements the Music Compilation service by instead mixing tracks and partial tracks that are determined by the Trip Brain to be appropriate for the current trip, the current stage of the trip, and so forth.

In implementations a Music Compilation method implemented by the system includes a step of classifying music tracks and/or partial tracks not according to music style (or not only according to music style), but according to the context of a trip. A representative example is given in table 1300 of FIG. 13, wherein trip contexts of commute, errand, road trip, and trip with family are given. In other implementations there may be fewer or more trip contexts, such as: commute to work, commute from work, doing taxiing work (such as through LYFT or UBER), late night return home, and so forth. Table 1300 compares the trip-befitting genres with lists of categories that might be used in conventional streaming services, such as traditional genres of rock, hip-hop, classical and reggae, or streaming service genres of chill, finger-style, nerdcore and spytrack. The Music Compilation method may use tracks and portions of tracks from these and any other genres, but weaves them into a compilation that is fitting for a given trip.

In implementations the Music Compilation method includes analyzing each song by multiple criteria. One representative example of this is given by table 1400 of FIG. 14, which representatively illustrates that a Music Compilation method may analyze each song by the four criteria of tempo, approachability, engagement and sentiment. Tempo in this implementation refers to beats per minute. Approachability in this implementation is related to how accessible versus how challenging the song is. Engagement refers to whether the song is a "lean forward" (e.g., requiring attention) or "lean backward" (e.g., being in the background) song, and sentiment refers to the mood of a song. In implementations each criteria may be further broken down (or may include) sub-categories, so that in the representative example: tempo, as indicated, includes beats per minute; approachability includes chord progression, time signature, genre, motion of melody, complexity of texture, and instrument composition; engagement includes dynamics, pan effect, harmony complexity, vocabulary range, and word count; and sentiment includes chord type, chord progression, and lyric content.

Accordingly, in implementations, instead of dividing a music catalog into traditional genres or streaming service genres, the Music Compilation service organizes the music catalog according to what type of drive (like commute to work or errand) and social dynamic a song is appropriate for. As an example, a traveler will listen to different music if alone in the car versus driving with a 9-year old daughter or versus traveling with a business contact who may be classified as a weak social connection. In this sense, the Music Compilation service (in other words, the Music Compilation method) is done in a context-aware and trip-befitting manner.

This type of Music Compilation in implementations results in playlists that are not necessarily linear, or in other words the songs in the playlist are not necessarily similar to one another. Additionally, the method may exclude random selection of songs (or random selection within a given category) but is much more curated to fit the conditions of the trip and/or the mood of the occupants. In this way the method includes effectively creating a DJ set, utilizing the nuanced skills and rules that make a soundtrack befitting for a particular journey. This includes, in implementations, selecting an optimal song order for a drive including when to bring the vibe up, when to subtly let the mood drop, when to bring the music to the forefront, when to switch it to the background, when to calm, when to energize, and so forth. The Trip Brain and/or other elements of the system may determine, based on the trip details, how long the set needs to be, appropriate moods, appropriate times to switch the mood, and so forth.

The Music Compilation methods may also include, at times, using only samples of songs instead of only full tracks. In short, the Music Compilation methods may utilize professional DJ rules and DJ mix techniques to ensure each soundtrack or set enhances a traveler's mood.

Referring back to FIG. 14, more detail might be given about representative analysis criteria, as follows, which might be used by the methods and by the system to curate a playlist for any given trip.

Tempo

Beats per minute is a metric used to define the speed of a given track.

Approachability

Figure 15:
FIG. 15 is a set of tables representatively illustrating other elements of the example music compilation method of FIG. 21.

Chord progression—Common chord progressions are more familiar to the ear, and therefore more accessible to a wider audience. They are popular in genres like rock and pop. Genres such as classical or jazz tend to have more complex, atypical chord progressions and are more challenging. Tables 1500 of FIG. 15 show a number of common chord progressions. The system and method could use any of these chord progressions, or other chord progressions, to categorize any given track along a spectrum of typical to atypical chord progression.

Time Signature—Time signature defines the beats per measure, as representatively illustrated in diagram 1600 of FIG. 16. The most common and familiar time signature is 4/4, which makes it the most accessible. 3/4 is significantly less common (and therefore marginally more challenging), but still relatively familiar, as heard in songs such as Bob Dylan's "The Times They Are A-Changin'." Uncommon time signatures such as 5/4 (e.g., Dave Brubeck's "Take Five") are more challenging as they are more complex and engaging than traditional time signatures. Also worth noting is that songs can have varying time signatures. As a non-limiting example, The Beatles' "Heavy" is 4/4 in the verses and 3/4 in the chorus. FIG. 16 only representatively illustrates the 4/4, 3/4, and 2/4 time signatures, but the system and method may determine (and assess approachability) according to any time signature, including by non-limiting examples: simple (e.g., 3/4 and 4/4); compound (e.g., 9/8 and 12/8); complex (e.g., 5/4 or 7/8), mixed (e.g., 5/8 & 3/8 or 6/8 & 3/4), additive (e.g., 3+2/8+3), fractional (e.g., 2½/2/4), irrational (e.g., 3/10 or 5/24), and so forth.

Genre—More popular and common genres of music such as rock, R&B, hip-hop, pop, and country are more accessible. Less popular genres like electronic dance music, jazz, and classical can be less familiar, and more challenging. The systems and methods may accordingly use the genre to categorize a track as more or less approachable, accordingly.

Figure 17:
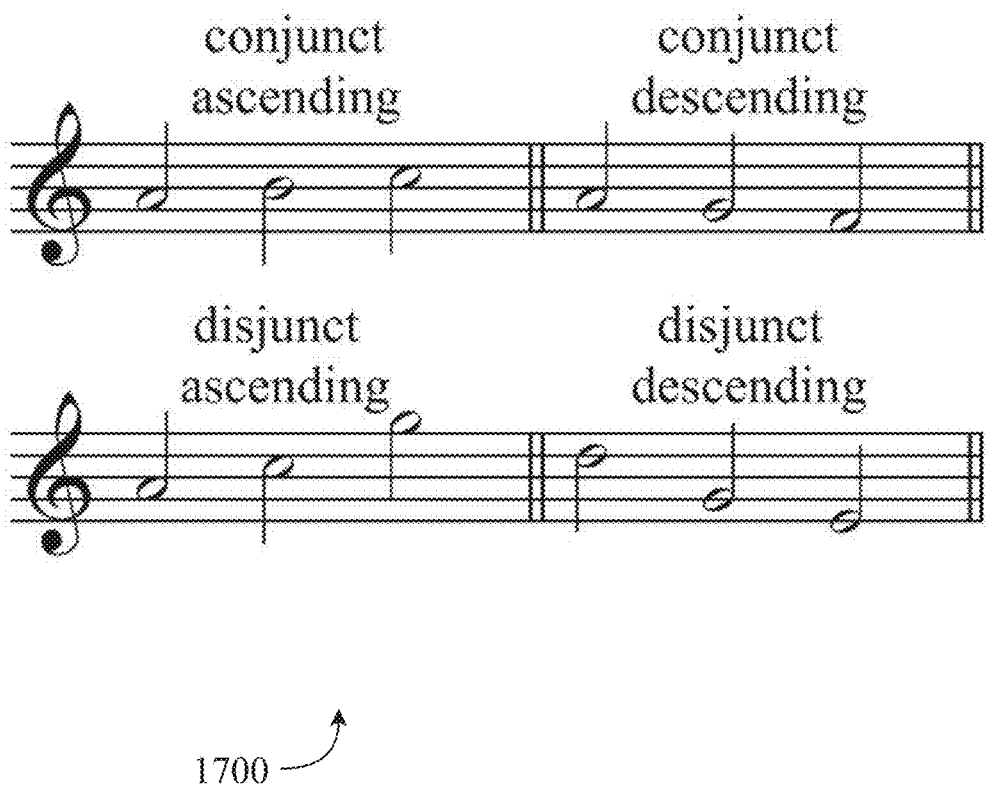
FIG. 17 is a diagram representatively illustrating other elements of the example music compilation method of FIG. 21.

Motion of Melody—Motion of Melody is a metric that defines the variances in melody's pitch over multiple notes. This is representatively illustrated by diagram 1700 of FIG. 17. Conjunct melody motions have less variance, are more predictable, and are therefore more accessible (i.e., more approachable), while disjunct melody motions have a higher variance, are less predictable, and are more challenging (and so less approachable).

Complexity of Texture—Texture is used to describe the range of which the tempo, melodies, and harmonics combine into a composition. For example, a composition with many different instruments playing different melodies—from the high-pitched flute to the low-pitched bass—will have a more complex texture. Generally, a higher texture complexity is more challenging (i.e., less approachable), while a lower texture complexity is more accessible—easier to digest for the listener (i.e., more approachable).

Instrument Composition—Songs that have unusual instrument compositions may be categorized as more challenging and less approachable. Songs that have less complex, more familiar instrument compositions may be categorized as less challenging and more approachable. An example of an accessible or approachable instrument composition would be the standard vocal, guitar, drums, and bass seen in many genres of popular music.

Engagement

Dynamics—Songs with varying volume and intensity throughout may be categorized as more lean-forward, while songs without much variance in their volume and intensity may be categorized as more lean-backwards.

Pan Effect—An example of a pan effect is when the vocals of a track are played in the left speaker while the instruments are played in the right speaker. Pan effects can give music a uniquely complex and engaging feel, such as The BEATLES' "Because" (lean-forward). Songs with more or unique pan effects may be categorized as more lean-forward, while songs with standard or minimal pan effects are more familiar and may be categorized as more lean-backwards.

Harmony Complexity—Common vocal or instrumental harmonic intervals heard in popular music—such as the root, third, and fifth that make up a major chord—are more familiar and may be categorized as more lean-backwards. Uncommon harmonic intervals—such as root, third, fifth and seventh that make up a dominant 7 chord—are more complex, uncommon, and engaging and may be categorized as more lean-forward. The BEATLES' "Because" is an example of a song that achieves high engagement with complex, uncommon harmonies.

Vocabulary Range—Vocabulary range is generally a decent metric for the intellectual complexity of a song. A song that includes atypical, "difficult" words in its lyrics is more likely to be described as lean-forward—more intellectually engaging. A song with common words is more likely to be described as lean-backwards—less intellectually engaging.

Word Count—Word count is another signal for the complexity of the song. A higher word count can be more engaging (lean-forward), while a lower word count can be less engaging (lean-backwards).

Sentiment

Chord Type—Generally, minor chords are melancholy or associated with negative feelings (low sentiment) while major chords are more optimistic or associated with positive feelings (high sentiment).

Chord Progression—If a song goes from a major chord to a minor chord it may be an indication that the sentiment is switching from high to low. If the chord progression goes from major to minor and back to major it may be an indication that the song is uplifting and of higher sentiment. Other chord progressions may be used by the system/method to help classify the sentiment of a song.

Lyric Content—A song that has many words associated with negativity (such as "sad," "tear(s)," "broken," etc.) will likely be of low sentiment. If a song has words associated with positivity (such as "love," "happy," etc.) it will more likely be of high sentiment.

Accordingly, the systems and methods may analyze the tempo, approachability, engagement, and sentiment of each track based on an analysis of the subcategories, described above, for each track. In implementations fewer or more categories (and/or fewer or more subcategories) may be used in making such an analysis. This analysis could be done at the Trip Brain level or it could be done higher up the system by the servers and databases—for example one or more of the servers could be tasked with "listening" to songs in an ongoing manner and adding scores or metrics in a database for each track, so that when a user is on a drive the system already has a large store of categorized tracks to select from. Alternatively or additionally, the Trip Brain may be able to perform such an analysis in-situ so that new tracks not categorized may be "listened" to by the Trip Brain (or by servers communicating with the Trip Brain) during a given trip and a determination made as whether to add it to, and where to add it to, an existing trip playlist so that it is then played audibly (in full or in part) for the user. Various scoring mechanisms could be used in categorizations. For example, with regards to engagement each sub-category could be given equal weight. This could be done by assigning a score of 0-20 to each sub-category, so that a song with maximum dynamics, pan effect, harmony complexity, vocabulary range and word count would be given a score of 20+20+20+20+20=100 for engagement (i.e., fully lean-forward). In other implementations some sub-categories could be given greater weight than other sub-categories, and in general various scoring mechanisms could be used to determine an overall level for each main category.

Figure 18:
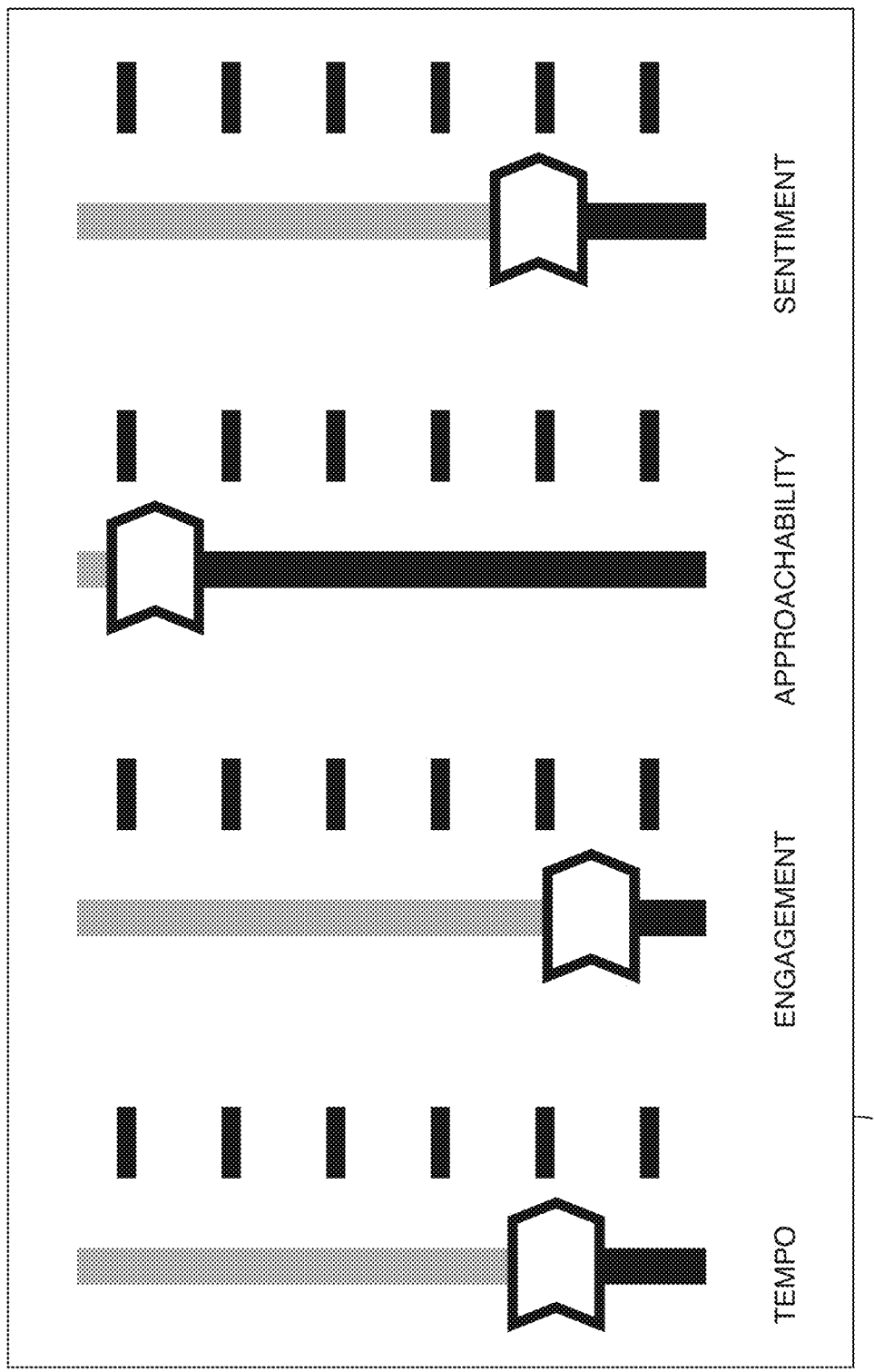
FIG. 18 is a diagram representatively illustrating other elements of the example music compilation method of FIG. 21.

As a further example, suppose a driver is taking a highway trip. Here, it may be desirable to have mid-tempo songs to discourage speeding, and to keep engagement low so that the traveler's mind can wander. Let us also suppose that based on the composition of passengers in the cabin it may be desirable to have high approachability, and that (also based on the composition of passengers) it may be desirable to have a low-key or neutral sentiment to the music. The system may, based on these determinations, select an internal setting for the music. This is representatively illustrated by diagram 1800 of FIG. 18, which representatively illustrates a level for each setting so that tempo, engagement, and sentiment are set to low levels while approachability is set to a very high level. FIG. 18 only representatively illustrates, however, what is happening internal to the system—the user may never actually see such a diagram indicating the settings chosen by the system.

It will be pointed out here that various methods may be used to determine how many people, and which specific people, are in the cabin in order to help determine appropriate levels for each category. BLUETOOTH connections from the system (or Trip Brain of the system) to users' mobile phones may, as an example, indicate to the system who is present in the vehicle. The system may determine based on sound input gathered from a microphone of in-car conversations whether any given passenger is a weak, medium or strong social connection. Some such information could also be gathered by using information from social media or other accounts—for example are these two passengers FACE BOOK friends, or are they not FACEBOOK friends, but are they associated with the same company on LINKEDIN, did this trip begin by leaving a workplace in the middle of the day (i.e., more likely a trip with coworkers and/or boss and/or subordinates), did the trip begin by leaving home in the evening (i.e., more likely a trip alone or with family), and so forth. Granted, such information gathering may be considered by some to be invasive of privacy, and the systems and methods may be tailored according to the desires of a user and/or the admin according to acceptable social norms and individual comfort level to provide useful functions without an unacceptable level of privacy invasion. The system may for example have functions which may be turned on or off in a settings interface at the desire of the user.

Returning to our example of the highway trip, if there is a traffic jam the system may, upon gathering info from the vehicle navigation suite and/or communicatively connected third party services (such as GOOGLE maps) determine that there is a traffic jam. The system may then dynamically adjust the levels so that the tempo goes up, engagement switches from low to high, and so forth to switch from more background-like music to lean-forward music in order to distract the traveler from the frustrating road conditions, and the sentiment may also appropriately switch to positive and optimistic.

Figure 19:
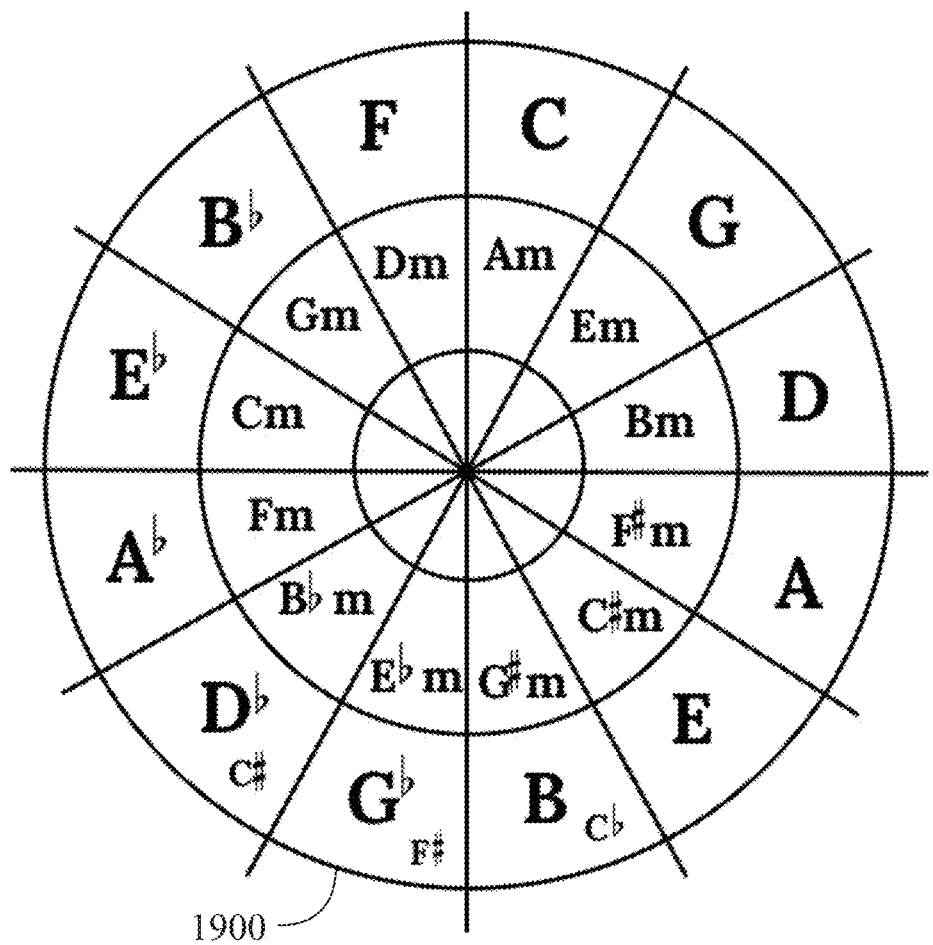
FIG. 19 is a diagram representatively illustrating other elements of the example music compilation method of FIG. 21.

In implementations the system may identify the key of each song to determine whether any two given songs would fit well next to each other in a playlist, i.e., whether they are harmonically compatible. The system could for example use a circle-of-fifths, representatively illustrated by diagram 1900 of FIG. 19, and a stored key for each song to ensure that a playlist moves around the circle and between the inner and outer wheels with every mix, progressing the soundtrack as desired and as would be done by a professional DJ.

Figure 20:
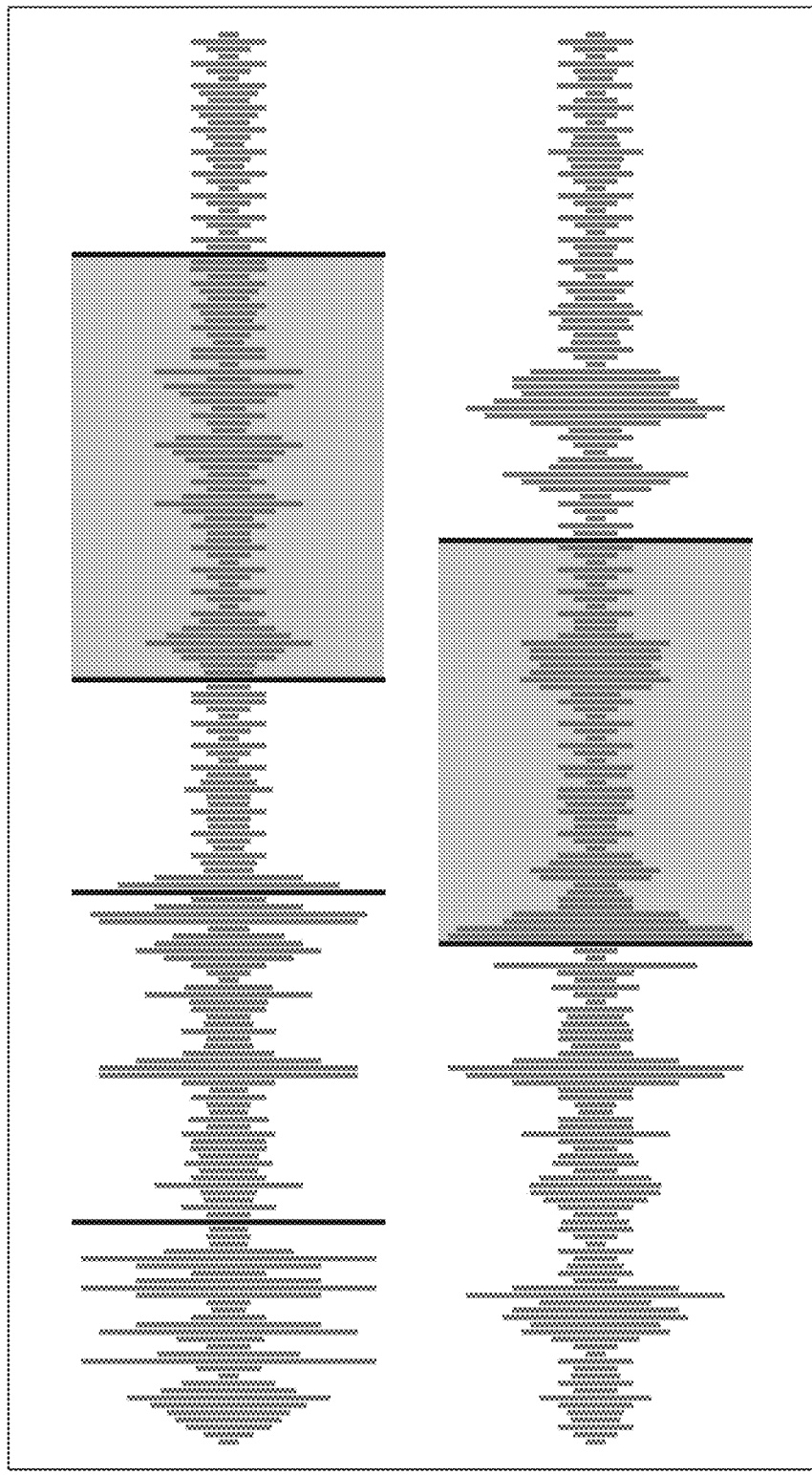
FIG. 20 is a diagram representatively illustrating other elements of the example music compilation method of FIG. 21.

The system may also implement a cue-in feature to determine where to mix two tracks, identifying the natural breaks in each song to smoothly overlay them. Diagram 2000 of FIG. 20 representatively illustrates this, where sound profiles of a first track (top) and second track (bottom) are analyzed to determine the most likely places of each track (shown in gray) for one track to mix and switch to the other track. In such a mixing the first track may not completely finish before the second track mixes in, and similarly the second track may not be mixed in at the very beginning of the second track, but rather the tracks may be mixed in at locations of each song that would provide for the best transition between songs. The system may also use a transition technique such as fading out the first track and fading in the second track for a smoother transition.

The Music Compilation service can operate in conjunction with music libraries and music streaming services to allow travelers to shortcut the art of manually creating their own mixes, while retaining the nuanced skills and rules to make a befitting soundtrack for each particular journey. One or more algorithms associated with the Music Compilation service may be configured to curate the right mix for each drive and know when to adjust the settings either ahead of time or in-situ as situations change.

Figure 21:
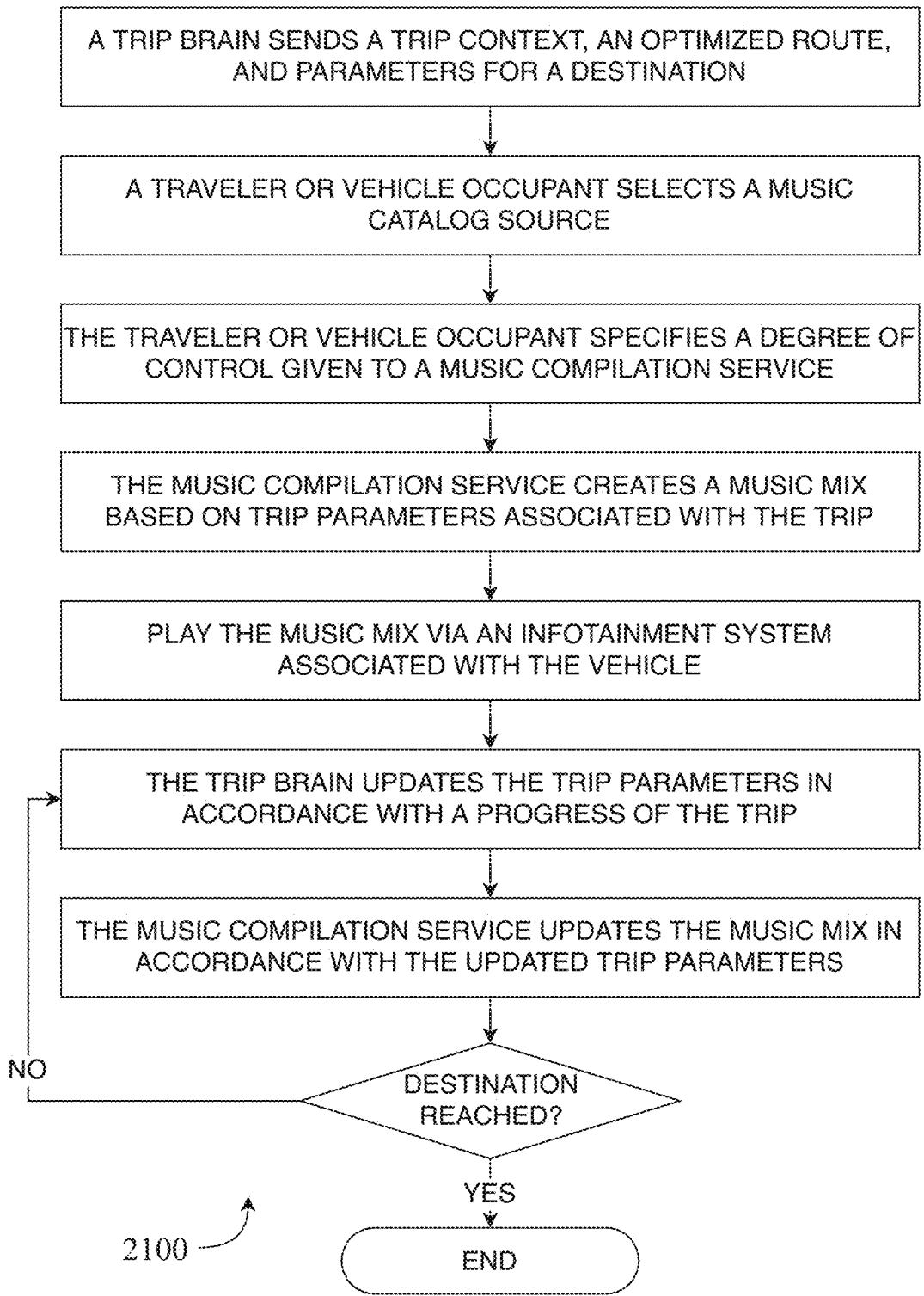
FIG. 21 is a flowchart representatively illustrating an example music compilation method implemented using the system of FIG. 1.

Flow diagram (flowchart) 2100 of FIG. 21 representatively illustrates a method of operation of the Music Compilation service, as carried out by the system. In implementations the Trip Brain determines the six qualities of trip context and sends an optimized route for the trip and trip parameters such as traffic and waypoints as discussed above. Information about the trip may be presented to a driver of a vehicle in the form of an infographic as shown in FIGS. 6 and/or 7. Next, a traveler or vehicle occupant may select a music catalog source. This could for example be done by selecting from a prepopulated list of cloud-based catalog sources such as ITUNES, SPOTIFY, and/or the like which a user may input profile and login information for in order for the system to use music from those libraries to create the playlist, or the user may link some other account or library storage location to the system for this purpose. The system could also have its own default library of tracks which may be used if a user does not select a specific library or set of libraries.

The driver or a passenger specifies the amount of control given and music to be used by the Music Compilation service. This may be done using one or more inputs or selections on one or more user interfaces and/or through audio commands to the AI Sidekick. The user could for instance instruct the system to include certain songs in the playlist or to create a playlist entirely from scratch, could ask for a playlist within certain parameters such as an engaging or exciting playlist or a more chill playlist, could review the playlist before it begins and make edits to it at that point or leave it unaltered, could pause the playlist at any point along the trip, could request a song to be skipped or never played again, could ask for a song to be repeated, and so forth. Some of these settings may be edited in a settings menu to be the default settings of the Music Compilation service.

Referring still to FIG. 21, the Trip Brain creates a mix from a plurality of music tracks associated with the driver-selected music catalog(s) based on the trip parameters as determined by the Trip Brain. The Music Compilation service may play the music mix via an infotainment system associated with the vehicle (this may simply be the speakers of the vehicle playing the audio with associated track information shown on a user interface on the display of the vehicle, which user interface may also include selectors for skipping, rewinding, fast forwarding, pausing, etc.). As the trip progresses the Trip Brain updates the trip parameters in accordance with a progression of the trip, and in response the Music Compilation service may update the music mix in accordance with the updated trip parameters. For example, during a traffic jam the Music Compilation service may change its internal settings (e.g., sentiment, engagement, etc.) and revise its track selections accordingly. On an ongoing basis, the Trip Brain checks to see if the destination is reached. If the destination is not reached, the Trip Brain returns to updating the trip parameters in accordance with a progress of a trip and the Music Compilation service adjusts accordingly. If the destination is reached, the process ends. In implementations, the user may be able to save and name the soundtrack that was just played locally to the vehicle or to a remote location (e.g., database storing user information). In implementation, the user may be able to re-play a saved soundtrack through a selection on one or more of the user interfaces in the vehicle or by instructing the AI Chatbot through an audio command. In implementation, the system may add metadata to the saved soundtrack such as date played, time played (e.g., 11:04 AM until 12:56 PM), start and/or end points for the trip, and so on. In implementations, the user may be able to recall the saved soundtrack.

In implementations, the Music Compilation service may provide multiple partial soundtracks for a particular drive. Each partial soundtrack may be based on trip conditions and context, in addition to the particular preferences and characteristics of one or more travelers in the vehicle. Hence, the trip soundtrack may be controlled, in duration or partially, by the driver, as well as any of the passengers in the car.

The Music Compilation service may, in other implementations, include more or fewer steps, and in other orders than the order presented in FIG. 21.

The Music Compilation service/methods may work seamlessly with other system elements to accomplish a variety of purposes. For example, the Music Compilation service may work with the Wayfinding methods to determine how long a playlist should be, when to switch the mood (e.g., during traffic jams), and so forth. The Music Compilation service/ methods could also work pauses (or volume decreases) into the playlist, such as at likely stops for gas, restroom breaks, food, and so forth when passengers may be more engaged in discussion. The system may also proactively reduce volume when conversations spark up on a given trip as determined by measuring the sound coming into a microphone of the system (which may simply be a vehicle microphone). As another example, the system may detect a baby crying in the vehicle and, in response, switch the music to soothing baby music, or music that has proven in the past to calm the baby.

In implementations the Music Compilation service could be implemented in any type of transportation setting, automobile or otherwise, but the Music Compilation service is not limited to vehicle settings. As many of the Music Compilation methods as could feasibly be implemented in a non-vehicle setting may be, such as through a streaming service implemented through a website (such as using the web server of FIG. 1), through a mobile device application (such as using the application server of FIG. 1), and so forth. In this way, the Music Compilation service could be implemented apart from and independent from any vehicle setting, but could be simply utilized as a music streaming service that incorporates the methods and characteristics described above.

AI Sidekick/Interactive Chatbot

In implementations the system 100 may be used to implement an artificial intelligence (AI) Sidekick which interacts with travelers through the display and/or through audio of the vehicle. In implementations the Sidekick is an Interactive Chatbot which can learn and adapt to the driver and other occupants of the vehicle. In implementations the Interactive Chatbot service tailors its support of the car inhabitants to the unique environment of the car. It may, for example, focus at times on enhancing the wellbeing of the travelers and the sanctuary-like nature of the car. The Interactive Chatbot in implementations and/or in certain settings may instruct or teach the travelers, and in such instances may be a pedagogical chatbot. In implementations the AI Sidekick is not merely a chatbot assistant (i.e., only shortcutting tasks for the user) but is more of a companion— more emotionally supportive as opposed to only tactically or functionally supportive.

The AI Sidekick may at times support or promote mind-wandering of the travelers, creative thinking, problem solving, brainstorming, inspiration, release of emotion, and rejuvenation. It may help to ensure that time in the car is an opportunity to release emotions not allowed in other contexts. It may ensure that the vehicle is a space where travelers can process thoughts and feel more "themselves" when they step out of the car than they did when they got in. The chatbot may help a traveler transition from one persona or role to another (for instance on the commute home transitioning from boss to wife and mom). The chatbot may give travelers the opportunity to reflect on their day and vent, if appropriate.

To implement the chatbot's role, the Trip Brain may use various data sources including vehicle sensors, the traveler's calendar, trip parameters, and so on to determine a traveler's mood, state of mind or type of transition (if appropriate). For example, vehicle sensors can detect if the driver is gripping the steering wheel harder than usual. Other sensors in the seat can tell the Trip Brain that the traveler is fidgeting more than usual in his seat. Accelerometer readings can inform the Trip Brain that the traveler's driving style is different than usual (e.g., faster than usual, slower reaction time than usual, etc.).

In implementations the traveler may adjust, through one or more user interfaces or through audio commands, the level of intervention and support provided by the Interactive Chatbot. If the Trip Brain determines that the traveler is likely to be in a bad mood and if permitted by the traveler's control setting, the Interactive Chatbot may invite the traveler to share his experience to help him open up about his problems. The chatbot may, in implementations, not be simply reactive (i.e., only responding to user initiation and self-reporting). Rather, the Interactive Chatbot may be set to either be more proactive and assess the validity of self-reported information or initiate appropriate questions based on sensory input, or may be set to simply be reactive and let the user initiate interaction.

Figure 22:
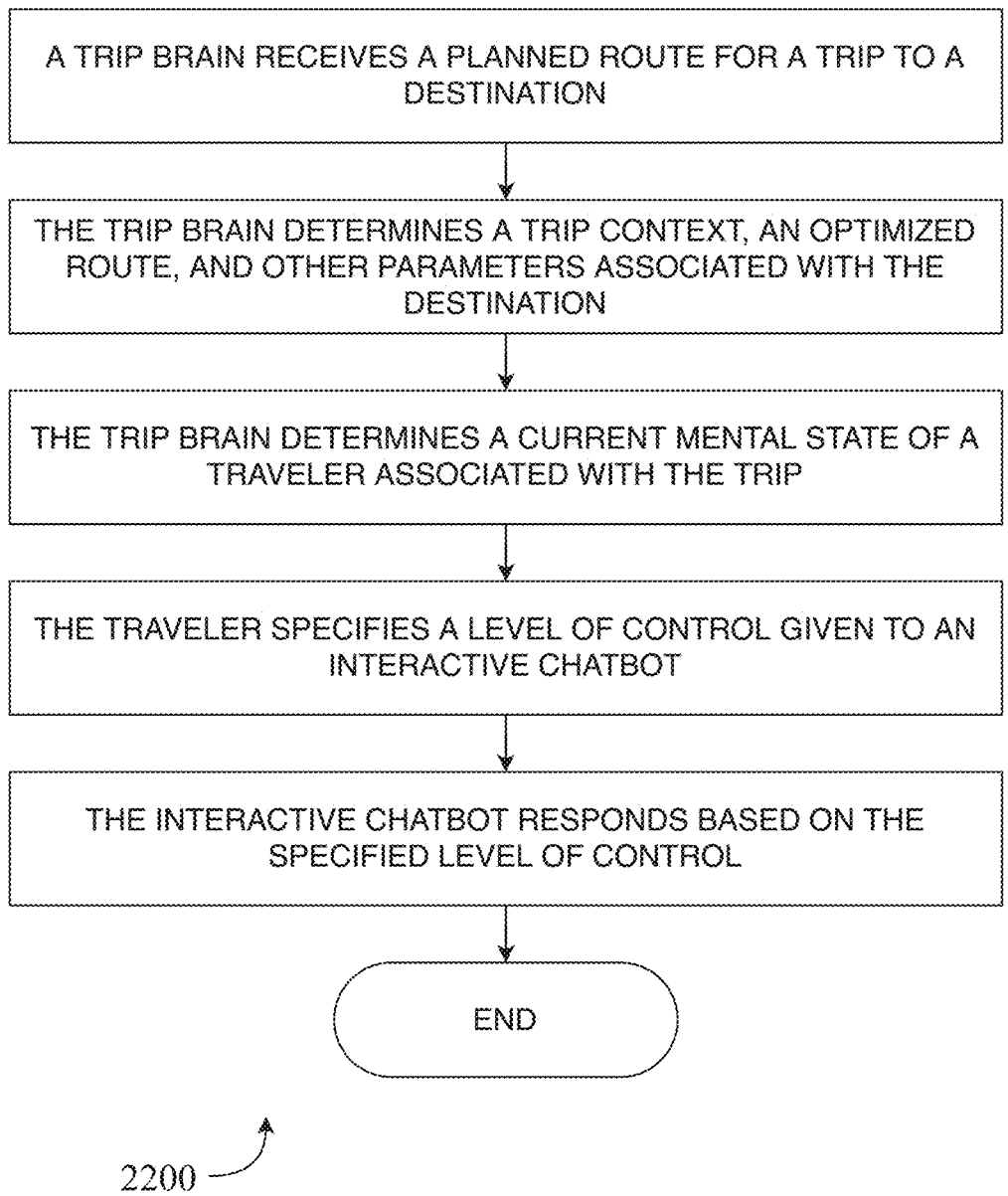
FIG. 22 is a flowchart representatively illustrating an example method of implementing an interactive chatbot using the system of FIG. 1.

Flow diagram (flowchart) 2200 of FIG. 22 illustrates a representative example of operation of the Interactive Chatbot. Initially, the Trip Brain receives a planned route for a trip to a destination. The Trip Brain analyzes the planned route to determine trip parameters such as traffic and waypoints as discussed above. Information about the trip may be presented to a driver of a vehicle in the form of an infographic as shown in FIGS. 6 and/or 7. The Trip Brain determines the traveler's current mental state, which may be accomplished by analyzing the trip parameters, vehicle sensors, and the environment in the vehicle (e.g., use of infotainment). During the trip, the Trip Brain constantly monitors the aforementioned data sources and updates mental state assessment as appropriate. Depending on the level of control that the traveler has specified for a particular trip, the Trip Brain may adjust the environmental conditions on the vehicle (e.g., temperature, volume, song mix, etc.) or offer an interactive conversational environment using the Interactive Chatbot for as long as the traveler would like to engage.

The Interactive Chatbot service may, in other implementations, include more or fewer steps, and in other orders than the order presented in FIG. 22.

Speaking now broadly about various system benefits, system 100 and related methods may provide alternative approaches to viewing the vehicle environment, i.e., as an experience for the traveler as a passenger instead of only as a driver. The systems and methods disclosed herein allow the driving experience to be about lifestyle, leisure activity, learning, well-being, productivity, and trip-related pleasure. Systems and methods described herein allow the vehicle to serve as a task-negative space (analogous to the shower) that lets travelers' minds wander, helps them emotionally reset, and serves as a sanctuary and a place of refuge. This allows travelers to derive profound personal benefit from a journey. Time in the vehicle is transformed into an opportunity to release emotions that might not be allowed anywhere else. It becomes a space where travelers can process thoughts and feel more "themselves" after stepping out of the car.

Systems and methods described herein promote creative thinking and inspiration by providing a place and atmosphere to reboot the traveler's brain. These systems and methods help to provide a cognitive state of "automaticity" where the mind is free to wander. This allows the subconscious mind of the traveler to work on complex problems, taking advantage of the meditative nature of drives.

Systems and methods described herein provide a chatbot that is much more than a virtual assistant for productivity, but is rather a virtual Sidekick in the car that is proactive, supportive, resourceful, and charismatic.

Various aspects and functionalities of systems and methods described herein operate together as a single system and not as a set of disjointed applications. This allows applications, alerts, information, vehicle sensors and data, entertainment, and so forth to be woven together seamlessly into a delightful, unified travel experience. Wayfinding using the systems and methods herein includes more than transactional navigation but also adventure, exploration and possibility. Music listening using the systems and methods herein is more artistic, deep, meaningful, personalized, and intimate than the common linear streaming experiences of similar-sounding songs.

In implementations systems and methods disclosed herein may allow access to all system functionalities with an in-vehicle humanized voice-enabled agent (aforementioned Interactive Chatbot or AI Sidekick) and may be predictive and opportunistic, proactively starting conversations, music, games, and so forth (not requiring manual user control for every action). The systems and methods may be context-sensitive (e.g., aware of situations, social atmosphere, and surroundings), may provide for social etiquette of the voice-enabled agent, and may provide varying degrees of user control. The systems and methods may include utilizing personal information and drive histories to learn preferences and interests and adjusting behavior accordingly, and yet may be ready to be used out of the box without a time-consuming set-up.

To recap, some functionalities that may be performed by systems and methods disclosed herein include:

Route Selection: The AI Sidekick can help the traveler decide among the straightest way, the quickest way, the most interesting way, the most scenic way, and the way to include the best lunch break along a trip. Reducing unnecessary information, the system and the AI Sidekick are configured to provide relevant, customized, curated information for the trip.

Helping manage children: The AI Sidekick can help keep children in the car entertained, thereby reducing the cognitive load on the driver. The AI Sidekick can iteratively try different solutions (e.g., music, games, conversation). For instance, the AI Sidekick could initiate the game "20 Questions." Player One thinks of a person, place or thing. Everyone takes turns asking questions that can be answered with a simple yes or no. After each answer, the questioner gets one guess. Play continues until a player guesses correctly. If the children seem disengaged, the AI Sidekick could move on to a different game or activity.

Social ice-breaker: If desired by the car inhabitants, when there is a lull in the conversation with more than one person in the vehicle, the AI Sidekick may be configured to initiate a conversation by, for example, talking about something in the news, sharing a dilemma, or starting a game. Other features associated with the AI Sidekick may include voice and face recognition to determine the occupant(s) of the vehicle and steer the conversation accordingly. For instance, the AI Sidekick can initiate the pop-culture and news game "Did you hear that . . . " The game is about fooling your opponents. The AI Sidekick starts by asking "Did you hear that _____ happened?" The car inhabitants can then either say "That did not happen" or "It did happen." The AI Sidekick can then either confirm it made it up or read the report from its Internet source.

Moodsetting: The AI Sidekick may be configured to set a temperature at which the driver is comfortable and alert enough, a music volume at which the car inhabitants are distracted enough and the driver attentive enough, and a cabin light (e.g., instrument lighting) setting that allows the driver to see enough inside and out.

Companion: The Interactive Chatbot invites a driver to channel his or her emotions without judgement. For example, the driver may need to vent at someone, let out a stream of consciousness, or articulate an idea to hear what it sounds like. The AI Sidekick may be configured to actively listen and remember important details while focusing on the well-being of the vehicle occupant(s). The AI Sidekick may also assist the driver with brainstorming sessions, problem solving, and finding other ways to be creative or productive in the sanctuary of the vehicle.

Custodian: The system may provide information to the driver that helps him to shorten the trip, be safer, or be less hot-headed. The AI Sidekick may detect that a BLUETOOTH signal from an occupant's phone or office keycard is not present when s/he enters the car, at a time when s/he usually has the phone or keycard. The AI Sidekick may then prompt the occupant to check if s/he has it.

Time-management: On an 18-minute drive, the AI Sidekick may be configured to present to the driver an 18-minute music performance. On a 55-minute drive, the driver may be presented with a 55-minute podcast. If a driver arrives 45 minutes before an appointment, the AI Sidekick may direct the driver to a perfect spot to pass the time or provide information to prepare for the appointment as necessary and available.

Documentarian: A driver may have memories attached to important journeys. These memories can be reloaded by hearing the music playing while the driver drove or seeing the scenery they drove past. The AI Sidekick may be configured to record and replay audio, video, and/or photographs of specific trip details (inside and/or outside of the vehicle) and replay them at appropriate times. This could be done for example by an app on a traveler's phone communicating with the system to upload certain photos, videos, and so forth to a database of the system (which may be set to be done automatically in user settings), so that the next time a traveler is passing by the same location the system may offer the traveler the option of viewing the photos, videos, and/or listening to music or sound recordings from the previous trip to or past that location. The traveler may also be able to bring up any important memories by command, such as a voice command to the AI Sidekick to "bring up some memories of last summer's trip to Yosemite" or the like. In implementations and according to the privacy settings desired by users the system could record in-vehicle conversations to be replayed later to revisit memories.

DJ: In conjunction with the Music Compilation service, the AI Sidekick may be configured to present a curated Music Compilation for the driver's entertainment. This compilation may be from a streaming music source or from a private music catalog associated with the vehicle occupant(s).

While most of the features herein have been described in terms of user interaction with the AI Sidekick through audio commands/interaction, or interaction with one or more visual user interfaces on a display of the vehicle, in implementations any user in the vehicle could also interact with the system via a software app on any computing device that is capable of wireless communication with the system. This may be especially useful for example for a person in a back seat who may not be able to reach the visual display of the car but who may be able to, through an app, interact with the system. The same user interfaces shown in the drawings as being displayed on the vehicle display may be displayed (in implementations in a slightly adjusted format for mobile viewing) on any computing device wirelessly coupled with the Trip Brain or the system in general (such as through a BLUETOOTH, Wi-Fi, cellular, or other connection). A user may also use his/her computing device for audio interaction with the system and with the Interactive Chatbot.

The practitioner of ordinary skill in the art may determine how much of the system and methods disclosed herein should be implemented using in-vehicle elements and how much should be implemented using out-of-vehicle elements (servers, databases, etc.) that are accessed by communication with the vehicle through a telecommunications network. Even in implementations which are heavily weighted towards more elements being in-vehicle, such as storing more data in memory of an in-vehicle portion of the system (such as the Trip Brain) and relying less on communication with external servers and databases, interaction with third-party services such as music libraries, weather services, information databases (for the Interactive Chatbot and infographic displays), mapping software, and the like might still rely on the in-vehicle elements communicating with out-of-vehicle elements. Storage of some elements outside of the vehicle may in implementations be more useful, while storage of others in memory of the Trip Brain may be more useful. For example, a map of local, often traversed locations may be downloaded to memory of the Trip Brain for faster navigation (and may be updated only occasionally), while a map of remote locations to which a user sometimes travels may be more conveniently stored offline in database(s) remote to the vehicle or not stored in the system at all but accessed on-demand through third-party mapping services when the system determines that a user is traveling to a location for which no map is stored in local memory of the Trip Brain. In general, the practitioner of ordinary skill can shift some processes and storage remote from the vehicle using remote servers and databases, and some processes and storage internal to the vehicle using local processors and memory of the Trip Brain, as desired for most efficient and desirable operation in any given implementation and with any given set of parameters.

Additionally, a user profile, preferences, and the like may be stored in an external database so that if the user gets in a crash the user's profile and preferences may be transferred to a new vehicle notwithstanding potential damage to the Trip Brain or other elements of the system that were in the crashed vehicle. Likewise if a user purchases or rents a second vehicle the user may be able to, using elements stored in remote databases, transfer profile and preference information to the second vehicle (even if just temporarily in the case of a rented vehicle). The system may also facilitate multiple user profiles, for example in the case of multiple persons who occasionally drive the same car, and may be configured to automatically switch between profiles based on voice detection of the identity of the current driver or occupants in the car.

In places where the phrase "one of A and B" is used herein, including in the claims, wherein A and B are elements, the phrase shall have the meaning "A or B." This shall be extrapolated to as many elements as are recited in this manner, for example the phrase "one of A, B, and C" shall mean "A, B, or C," and so forth.

In places where the description above refers to specific embodiments of vehicle systems and interfaces and related methods, one or more or many modifications may be made without departing from the spirit and scope thereof. Details of any specific embodiment/implementation described herein may, wherever possible, be applied to any other specific implementation/embodiment described herein.

What is claimed is:

1. A vehicle method, comprising:
   providing one or more computer processors communicatively coupled with a display of a vehicle;
   processing data using the one or more computer processors;
   using the processed data, displaying, on one or more user interfaces displayed on the display of the vehicle, a visual summary of a defined route for a trip, the visual summary comprising:
   a start indicator representing a starting location of the defined route;
   an end indicator representing an end location of the defined route;
   a transition indicator, the transition indicator representing a transition location at which a driver of the vehicle will need to transition from a first road to a second road to remain on the defined route;
   a first estimated time indicator representing an estimated amount of time from a present time until a time at which the represented transition location will be reached;
   a road type indicator representing a type of the second road;
   a municipality indicator representing a municipality located between the starting location and the end location;
   a second estimated time indicator representing an estimated amount of time from the present time until a time at which the represented municipality will be reached; and
   a fuel/charge indicator representing a location between the starting location and the end location at which the driver may refill/recharge the vehicle; and
   in response to user selection of a first selector displayed on the one or more user interfaces, displaying the visual summary of the defined route for the trip; in response to user selection of a second selector displayed on the one or more user interfaces, displaying information about nearby fuel/charge stations; in response to user selection of a third selector displayed on the one or more user interfaces, displaying information about nearby eating locations; in response to user selection of a fourth selector displayed on the one or more user interfaces, displaying information about nearby sightseeing locations; in response to user selection of a fifth selector displayed on the one or more user interfaces, displaying information about nearby play locations and locations which welcome children; in response to user selection of a sixth selector displayed on the one or more user interfaces, displaying information about nearby locations which allow dogs.

2. The method of claim 1, further comprising displaying a places interface on the display, the places interface comprising:
- a stop indicator representing a stop location where the driver may stop for services or goods;
- a provider indicator indicating a type of service or good provided at the stop location; and
- a quantity indicator indicating a number of providers of the indicated service or good at the stop location.

3. The method of claim 2, further comprising displaying a providers interface on the display in response to user selection of one of the provider indicators, the providers interface comprising a list of providers providing the indicated service or good at the stop location and, for each provider, an estimated time of travel to the provider.

4. The method of claim 3, further comprising displaying a chosen provider interface on the display, the chosen provider interface including one or more selectors restricting the list of providers displayed on the providers interface to only chosen providers.

5. The method of claim 1, further comprising, in response to user selection of a music selector on one of the one or more user interfaces, initiating a music playlist.

6. The method of claim 1, further comprising, in response to selection of a chatbot selector on one of the one or more user interfaces, initiating a chatbot interaction.

7. A vehicle method, comprising:
- receiving, at one or more computer processors communicatively coupled with one or more user interfaces of a vehicle, one or more trip parameters;
- determining, by the one or more computer processors, using data from one or more sensors communicatively coupled with the one or more computer processors, a current mental state of a traveler in the vehicle; and
- initiating, using the one or more computer processors, interaction with the traveler using an interactive chatbot, wherein an interaction content of the interactive chatbot is determined by the one or more computer processors based at least in part on the current mental state;
- wherein the interaction content includes the interactive chatbot querying the traveler about whether a phone of the traveler is in the vehicle in response to a determination by the one or more computer processors that a wireless signal from the phone is not detected.

8. The method of claim 7, further comprising receiving from the traveler, through the one or more user interfaces, a selected level of control, and wherein the interaction content of the interactive chatbot is determined by the one or more computer processors based at least in part on the selected level of control.

9. The method of claim 7, further comprising entertaining children in the vehicle with the interactive chatbot by iteratively attempting music, interactive games, storytelling, and interactive conversation.

10. The method of claim 7, further comprising initiating a conversation, using the interactive chatbot, in response to a lull in a conversation between vehicle occupants of a predetermined amount of time.

* * * * *